US012490879B2

(12) United States Patent
Licata et al.

(10) Patent No.: US 12,490,879 B2
(45) Date of Patent: Dec. 9, 2025

(54) FLUID FLOW STRUCTURE AND METHOD OF USE FOR CONTINUOUS MOTION WASHING MACHINE

(71) Applicant: Unified Brands, Inc., Vicksburg, MS (US)

(72) Inventors: Michael P. Licata, Lee's Summit, MO (US); Richard Seiss, Mt. Juliet, TN (US); Roger Moore, Jackson, MS (US); Robert J. McNamara, Holliston, MA (US)

(73) Assignee: ELECTROLUX PROFESSIONAL, INC., Vicksburg, MS (US)

( * ) Notice: Subject to any disclaimer, the term of this patent is extended or adjusted under 35 U.S.C. 154(b) by 166 days.

(21) Appl. No.: 17/891,915

(22) Filed: Aug. 19, 2022

(65) Prior Publication Data

US 2023/0056546 A1 Feb. 23, 2023

Related U.S. Application Data

(60) Provisional application No. 63/235,585, filed on Aug. 20, 2021.

(51) Int. Cl.
*A47L 15/42* (2006.01)
*A47L 15/00* (2006.01)

(52) U.S. Cl.
CPC ....... *A47L 15/4272* (2013.01); *A47L 15/0086* (2013.01); *A47L 15/0092* (2013.01); *A47L 15/4223* (2013.01)

(58) Field of Classification Search
CPC ...... A47L 15/0092; A47L 15/08; A47L 15/02; A47L 15/4246; A47L 15/0086;
(Continued)

(56) References Cited

U.S. PATENT DOCUMENTS 3,208,732 A * 9/1965 Ranson ................... A47J 43/24
426/481
3,212,758 A * 10/1965 Ranson ................... A23N 12/02
134/186
(Continued)

FOREIGN PATENT DOCUMENTS

AU 2010238773 B2 10/2016
AU 2016244318 A1 11/2016
(Continued)

OTHER PUBLICATIONS

"Communication Pursuant to Article 94(3) EPC Received for European Patent Office Application No. 10767806.2, Mailed on May 25, 2021."
(Continued)

*Primary Examiner* — Michael E Barr
*Assistant Examiner* — Thomas Bucci
(74) *Attorney, Agent, or Firm* — Kutak Rock LLP

(57) ABSTRACT

A fluid flow structure for a washing machine is located within a wash tank of the washing machine, which includes a fluid flow guide surface, and a support for the guide surface. The guide surface includes at least one region contoured inconsistently from the contour of at least one corresponding wall of the washing machine wash tank. The contour of the guide surface is generally curved so as to aide in reducing and/or preventing the pinning of items that often occurs in rectangular wash tanks of the prior art. The support for the guide surface creates a gap between the guide surface and at least one wall of the washing machine wash tank.

22 Claims, 27 Drawing Sheets

(Transverse Section)

(58) Field of Classification Search
CPC ............. A47L 15/0076; A47L 15/4272; A47L 15/4223; B08B 3/00; A23N 12/02
USPC ............................... 134/25.1–4, 184, 64, 31
See application file for complete search history.

(56) References Cited

U.S. PATENT DOCUMENTS

| | | | |
|---|---|---|---|
| 3,226,095 A * | 12/1965 | Ranson | A23N 12/02 137/577 |
| 3,314,659 A * | 4/1967 | Ranson | A23N 12/02 134/183 |
| 4,712,351 A | 12/1987 | Kasprzak | |
| 4,773,435 A | 9/1988 | Ikeda et al. | |
| 4,773,436 A | 9/1988 | Cantrell et al. | |
| 6,115,541 A | 9/2000 | Rhodes | |
| 6,739,348 B2 | 5/2004 | Inch et al. | |
| 7,228,975 B2 | 6/2007 | Yang et al. | |
| 7,854,030 B2 | 12/2010 | Lee et al. | |
| 9,027,575 B2 | 5/2015 | Cantrell et al. | |
| 9,750,388 B2 | 9/2017 | John et al. | |
| 10,028,636 B2 | 7/2018 | Cantrell et al. | |
| 10,820,776 B2 | 11/2020 | Cantrell et al. | |
| 10,835,097 B2 | 11/2020 | Cantrell et al. | |
| 2003/0041886 A1 * | 3/2003 | Cantrell | A47L 15/08 134/182 |
| 2003/0041887 A1 | 3/2003 | Inch et al. | |
| 2004/0107977 A1 | 6/2004 | Cantrell et al. | |
| 2004/0244822 A1 | 12/2004 | Cantrell et al. | |
| 2005/0028847 A1 | 2/2005 | Kaczmarek | |
| 2006/0196528 A1 | 9/2006 | Jarvis | |
| 2008/0011328 A1 | 1/2008 | Cantrell et al. | |
| 2008/0093314 A1 | 4/2008 | Classen | |
| 2008/0099055 A1 | 5/2008 | Lemley | |
| 2010/0224220 A1 | 9/2010 | Cantrell et al. | |
| 2011/0017241 A1 | 1/2011 | Cantrell et al. | |
| 2011/0174339 A1 * | 7/2011 | Cantrell | A47L 15/08 134/25.1 |
| 2012/0298140 A1 * | 11/2012 | Cantrell | A47L 15/4246 134/10 |
| 2015/0013730 A1 | 1/2015 | John et al. | |
| 2018/0055331 A1 * | 3/2018 | Cantrell | B08B 3/102 |
| 2018/0325347 A1 | 11/2018 | Cantrell et al. | |
| 2020/0108421 A1 * | 4/2020 | Licata | B08B 3/10 |
| 2021/0030212 A1 * | 2/2021 | Chen | A47L 19/04 |
| 2021/0068611 A1 | 3/2021 | Cantrell et al. | |

FOREIGN PATENT DOCUMENTS

| | | |
|---|---|---|
| AU | 2018236823 A1 | 10/2018 |
| AU | 2016244318 B2 | 1/2019 |
| AU | 2018236823 B2 | 11/2020 |
| CA | 2768761 A1 | 10/2010 |
| CN | 1387414 A | 12/2002 |
| CN | 101366619 A | 2/2009 |
| CN | 102458209 A | 5/2012 |
| CN | 102458209 B | 9/2014 |
| CN | 104274139 A | 1/2015 |
| DE | 202004017681 U1 | 9/2005 |
| EP | 0372342 A1 | 6/1990 |
| EP | 2429370 A1 | 3/2012 |
| GB | 1227798 A | 4/1971 |
| JP | 6560409 B2 | 8/2019 |
| KR | 10-0597324 B1 | 7/2006 |
| WO | 2010124149 A1 | 10/2010 |
| WO | 2013123506 A1 | 8/2013 |
| WO | 2023023389 A1 | 2/2023 |

OTHER PUBLICATIONS

"English Machine Translation DE 10259763".
"English Machine Translation EP 1421893".
"Examination Report No. 1 received for Australian Patent Application Serial No. 2010238773 dated Sep. 18, 2015, 3 pages.", 3 pages.
"Examination Report Received for CA Application No. 2,768,761, mailed on Oct. 22, 2018, 3 pages", Oct. 22, 2018, 3.
"Extended European Search Report Received for European Application No. 09818631.5, mailed on Dec. 20, 2017, 10 pages".
"Extended European Search Report Received for European Application No. 10767806.2, mailed on Dec. 15, 2017.", p. 9.
"Final Office Action Received for U.S. Appl. No. 15/043,918, Mailed on Apr. 11, 2018, 16 pages."
"Final Office Action received for U.S. Appl. No. 16/042,824 on Feb. 24, 2020, pp. 15."
"Final Office Action Received for U.S. Appl. No. 12/765,838 mailed on Nov. 3, 2017"
"Final Office Action received for U.S. Appl. No. 12/765,838 dated Aug. 22, 2014, 12 pages.", 12 pages.
"Final Rejection Received for U.S. Appl. No. 15/695,888 mailed on Mar. 18, 2020".
"First Examination Report Received for Australian Application No. 2016244318, Mailed on Jan. 15, 2018."
"First Examination Report Received for Australian Application No. 2016250417, Mailed on Jan. 15, 2018, 3 pages".
"First Examiner report received for Application No. 2018236823, Aug. 5, 2019, 2 pages".
"First Office Action received for Chinese Patent Application Serial No. 201410412324.6 dated Jul. 20, 2016, 24 pages (including English Translation).", 24 pages.
"International Preliminary Report on Patentability received for PCT Application Serial No. PCT/US2010/032137 issued Oct. 25, 2011, 9 pages.", 9 pages.
"International Preliminary Report on Patentability received for PCT Application Serial No. PCT/US2013/026705 dated Aug. 28, 2014, 10 pages.", 10 pages.
"International Search Report and Written Opinion of International Patent Application No. PCT/US2013/026705, mailed Jun. 3, 2013".
"Non Final Office Action Received for U.S. Appl. No. 15/695,888 mailed on Jan. 2, 2019, 25 Pages."
"Non Final Office Action Received for U.S. Appl. No. 16/042,824, mailed on Aug. 22, 2019, 24 Pages."
"Non-Final Office Action Received for U.S. Appl. No. 15/043,918, Mailed on Sep. 18, 2017, 9 pages".
"Non-Final Office Action received for U.S. Appl. No. 12/765,838 dated Oct. 31, 2013, 12 pages.", 12 pages.
"Non-Final Office Action received for U.S. Appl. No. 14/379,190 dated Apr. 18, 2016, 13 pages.", 13 pages.
"Non-Final Office Action received for U.S. Appl. No. 14/379,190 dated Oct. 7, 2016, 16 pages.", 16 pages.
"Notice of Acceptance Received for Australian application No. 2018236823, Accepted on Jul. 29, 2020".
"Notice of Allowance Received for CA Application No. 2,768,761 mailed on Mar. 14, 2018".
"Notice of Allowance received for CN Application No. 201080028126.X mailed Jun. 5, 2014".
"Notice of Allowance Received for U.S. Appl. No. 12/765,838, Mailed on Mar. 27, 2018, 8 Pages."
"Notice of Allowance Received for U.S. Appl. No. 14/379,190, mailed on Apr. 28, 2017."
"Notice of Allowance Received for U.S. Appl. No. 15/043,918, Mailed on Jul. 5, 2018, 8 Pages."
"Notice of Allowance Received for U.S. Appl. No. 15/695,888, mailed on Jun. 26, 2020."
"Notice of Allowance Received for U.S. Appl. No. 16/042,824, mailed on Jul. 14, 2020."
"Office action received for Canadian Application No. 2,768,761 mailed on Jul. 4, 2017".
"Office action received for Canadian Application Serial No. 2,768,761 mailed on Feb. 15, 2016, 3 pages.", 3 pages.
"Office Action received for CN Application 201080028126.X, Mailed on Aug. 7, 2013."
"Second Examination Report Received for Australian Application No. 2016250417, Mailed on Aug. 24, 2018, 4 Pages."
"Written Opinion of International Patent Application No. PCT/US2010/032137 mailed on Jun. 21, 2010".
"Written Opinion of the International Search Authority for PCT/2009/059600, mailed Feb. 22, 2010, 8 pages".

(56) References Cited

OTHER PUBLICATIONS

Cantrell, John W, "Non Final Office Action Received for U.S. Appl. No. 15/695,888 mailed on Aug. 7, 2019, 9 Pages.", 9.

Cantrell, John , et al., "Non Final Office Action Received for U.S. Appl. No. 16/180,986, mailed on May 15, 2019, 12 Pages", Mar. 7, 2019.

"Notice of Allowance Received for U.S. Appl. No. 17/087,406, mailed on May 1, 2024".

"Non-Final Office Action received for U.S. Appl. No. 17/087,406, mailed on Feb. 2, 2023."

"International Search Report and Written Opinion for International Application No. PCT/US2022/041010, Search completed on Dec. 5, 2022, Mailed on Dec. 6, 2022."

"Restriction Requirement Received for U.S. Appl. No. 17/087,406, mailed on Nov. 22, 2022."

"Communication Pursuant to Article 94(3) EPC Received for European Patent Office Application No. 10767806.2, Mailed on Jul. 4, 2023."

"Non-Final Office Action received for U.S. Appl. No. 17/087,406, Mailed on Oct. 16, 2023".

"Communication Pursuant to Article 94(3) EPC Received for European Patent Office Application No. 10767806.2, Mailed on Dec. 4, 2024."

"Corrected Notice of Allowability Received for U.S. Appl. No. 17/087,406, mailed on Sep. 10, 2024."

\* cited by examiner (Transverse Section)

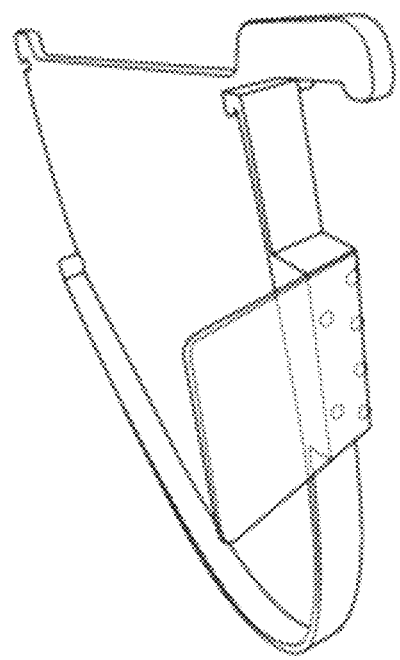
FIG. 21a
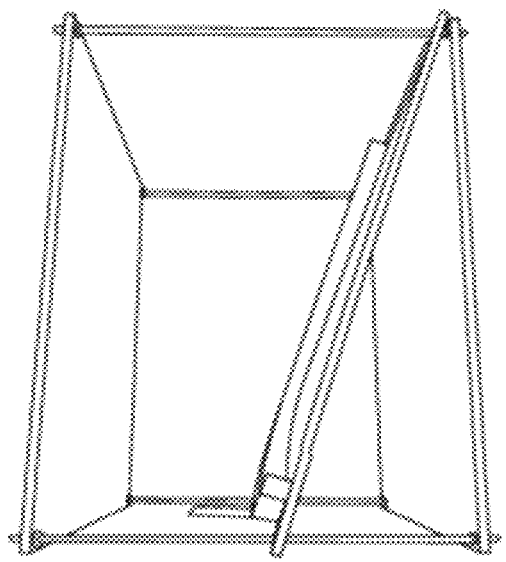 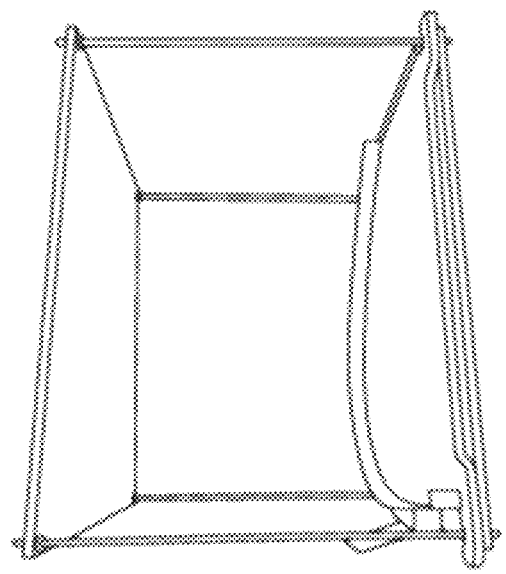
FIG. 21b    FIG. 21c

FLUID FLOW STRUCTURE AND METHOD OF USE FOR CONTINUOUS MOTION WASHING MACHINE

CROSS-REFERENCE TO RELATED APPLICATIONS

This application claims priority pursuant to 35 U.S.C. 119(e) to U.S. Provisional Patent Application Ser. No. 63/235,585, filed Aug. 20, 2021, the entire disclosure of which is incorporated herein by reference.

This application incorporates by reference the entire disclosure of U.S. patent application Ser. No. 17/087,406, filed Nov. 2, 2020, which claims priority pursuant to 35 U.S.C. 119(e) to each of the following:

U.S. patent application Ser. No. 16/042,824, filed Jul. 23, 2018, which is a divisional application of U.S. patent application Ser. No. 12/765,838, filed Apr. 22, 2010, now U.S. Pat. No. 10,028,636, which claims priority pursuant to 35 U.S.C. 119(e) to U.S. Provisional Patent Application Ser. Nos. 61/171,752 filed Apr. 22, 2009, 61/177,105 filed May 11, 2009, 61/227,686 filed Jul. 22, 2009, 61/231,987 filed Aug. 6, 2009, 61/233,811 filed Aug. 13, 2009, 61/236,801 filed Aug. 25, 2009, 61/255,083 filed Oct. 26, 2009, and 61/266,430 filed Dec. 3, 2009, the entire disclosures of which are incorporated herein by reference; and U.S. patent application Ser. No. 15/695,888, filed Sep. 5, 2017, now U.S. Pat. No. 10,820,776, which: is a continuation application of Ser. No. 14/379,190, filed Aug. 15, 2014, now U.S. Pat. No. 9,750,388, which is a continuation-in-part of U.S. Non-Application Ser. No. 12/765,838 (see above); and claims priority to Patent Cooperation Treaty Application No. PCT/US2013/026705 filed Feb. 19, 2013, which claims priority to U.S. Provisional Patent Application Ser. No. 61/600,581, filed Feb. 17, 2012, the entire disclosures of which are incorporated herein by reference.

FIELD OF THE INVENTION

The present invention relates to a washing machine, a fluid flow structure (such as a removable wash tank insert and/or a fluid-flow plate/guide structure) of a washing machine and methods of use of a fluid flow structure for a continuous motion washing machine (such as those used to wash items such as pots and pans and other ware, produce, etc.).

BACKGROUND

Continuous motion washing machines, such as pot and pan washing machines of the type used in restaurants, institutions, and other eating facilities, often involve a large wash tank or basin in which fluid is circulated to provide a rolling wash action for the pots, pans or other items being washed. One such machine is described in U.S. Pat. No. 4,773,436 issued to Cantrell et al., the specification of which is incorporated herein by reference. The machine of Cantrell includes a wash tank with multiple jets evenly spaced apart at an elevated position along the rear wall of the wash tank. The tank is filled with water (or other suitable wash fluid) to a level above the position of the jets. Pots and pans are placed in the wash tank, and a pump is activated to draw fluid from within the wash tank and direct it through the jets to create a jet stream. Each jet directs its jet stream toward the bottom wall of the wash tank, the bottom wall then deflects the jet stream upward and towards the front wall of the tank. The front wall then deflects the upward moving jet stream towards the rear wall of the tank, and the rear wall deflects the jet stream downward and back towards the front wall along the bottom wall. The combination of deflections of the jet stream from the bottom, front and rear walls provide a rolling washing action within the wash tank.

The basic components of the wash tank of the pot and pan washing machine of the prior art are shown in FIG. 1. Wash tank 10 includes end walls 12 and 14, rear side wall 16, front side wall 18 and bottom wall 19. A pump can be attached to either end wall; in the embodiment shown in FIG. 1, pump 50 is attached to right end wall 14. An impeller located within pump 50 is driven by electric motor 56. The impeller draws fluid into pump inlet 52 through an intake port (not shown) located in end wall 14. The fluid is then discharged from the pump through pump outlet 54 and into outlet manifold 60. Outlet manifold 60 includes a ninety degree turn, and several other turns, to direct the fluid across the back side of rear wall 16 and out jet nozzles 20 ("flow directional openings") which are protruding through and extending from rear wall 16. The intake port associated with pump inlet 52 is covered by perforated (holes, voids, mesh, etc.) intake manifold 30. Intake manifold 30 includes handle 36 and is removably supported within wash tank 10 for easy cleaning. Intake manifold 30 fits tightly between outer runner 32 and inner runner 34, each of which extends vertically from bottom wall 19. Heating element 40 is positioned between intake manifold 30 and end wall 14 for its protection and to maximize the use of space.

Although the prior art pot and pan washing machine disclosed in U.S. Pat. No. 4,773,436 provides an exceptional wash action, many of the components discussed above hinder the overall efficiency and performance of the machine. The inventions disclosed in U.S. application Ser. Nos. 09/947,484; 09/947,485; and 10/744,666, the entire disclosures of which are incorporated herein by reference, provide components that greatly increase the overall efficiency and performance of the machine, including improvements to the intake and discharge manifolds, jets, pump and system assembly methods. Nevertheless, it is often difficult to maintain suitable lifting action within the front portion of the wash tank to maintain the washing action, particularly when large, generally flat items are located toward the bottom front of the generally rectangular wash tank. Such items will tend to "stick" toward the bottom of the tank by the initial downward jet stream. The downward force from the jet stream can create a pinning action of certain types of items and these items will not roll and rotate with the wash action, resulting in these items remaining substantially soiled. In addition, as items roll and rotate within the wash tank, they often impact (with considerable force) the generally rigid steel walls of the wash tank. Such impacts result in significant noise during a wash cycle and also create unsightly and potentially harmful dents in the walls of the wash tank. In particular, dents in the bottom wall of the wash tank tend to pool water when the wash tank is drained, creating potentially unsanitary conditions. While prior art systems have been developed in which the bottom wall of the wash tank is curved (or barrel-shaped) to reduce or prevent such pinning, construction of wash tanks with such shapes is much more time consuming and expensive than construction of a generally rectangular wash tank. Moreover, it is often preferred to utilize a generally rectangular wash tank for maximizing the usable washing area within the wash tank, particularly for larger, longer items such as sheet pans. Furthermore, the generally rigid, metal walls of such curved tanks still experience significant impacts and noise during a wash cycle. Therefore, it would be beneficial to provide a washing machine, or component(s) thereof, that provide a wash action(s) that is suitable for washing a large variety of items of varying sizes, shapes and weights. It would further be beneficial to provide a washing machine, or component(s) thereof, that is cost-efficient to construct and/or that reduces impacts, noise or other vibrations action on the walls of the wash tank.

Modern commercial washing machines utilize a variety of adjustable, movable, and interchangeable parts. The large number of different parts increase the difficulty and expense of manufacturing, assembling, and maintaining the washing machines. Moreover, the excess parts add time and difficulty to cleaning and adjusting the washing machine while in service. As features are added to existing machine designs, they oftentimes add significant difficulties in machine maintenance and the additional parts tend to increase the time and space needed to maintain the machine. Moreover, the additional parts typically require additional adjustments be made while the machine is in service to ensure all parts are working together in an optimal fashion. It would be beneficial to ensure that additional features added to the machine do not greatly increase the complexity, expense, and difficulty of manufacturing, assembling, and maintaining the machine. Moreover, it would be advantageous to implement the prior-discussed beneficial features without significant time and space requirements for maintaining and warehousing the additional parts.

SUMMARY

An object of the instant invention is to provide a washing machine, or component(s) thereof, that provide a wash action(s) that is suitable for washing a large variety of items of varying sizes, shapes and weights. Another object of the instant invention is to provide a washing machine, or component(s) thereof, that is cost-efficient to construct and/or that reduces impacts, noise or other vibrations action on the walls of the wash tank.

The instant invention includes washing machine and/or a fluid flow structure for a washing machine wash tank. The instant inventions provide improvements to or for use with pot and pan or other item washing machines, such as those described in any of U.S. Pat. No. 4,773,436, U.S. application Ser. Nos. 09/947,484, 09/947,485, 10/744,666 and 12/430,724, or International application Ser. No. PCT/US09/59600 (the entire disclosures of which are incorporated herein by reference). It will be appreciated that other washing machine structures, or various combinations of washing machine structures or components thereof may be utilized in connection with the instant invention without departing from the spirit and scope of the instant invention.

The washing machine of, or in association with, the instant invention includes a generally rectangular wash tank including a bottom wall, two side walls and two end walls extending upwardly from said bottom wall. In a preferred embodiment, the side walls are longer than the end walls. The wash tank further includes at least one flow directional opening in at least one of the walls. In a preferred embodiment, the wash tank includes a plurality of flow directional openings positioned along one of the side walls of the wash tank.

A fluid flow structure is located within said wash tank, which includes a fluid flow guide surface, and a support for said guide surface. The guide surface includes at least one region contoured inconsistently from the contour of at least one corresponding wall of the washing machine wash tank. In a preferred embodiment, the contour of the guide surface is generally curved. The contour of the guide surface aids in reducing and/or preventing the pinning of items that often occurs in rectangular wash tanks of the prior art. The support for the guide surface creates a gap between said guide surface and at least one wall of the washing machine wash tank. The fluid flow guide surface defines a washing area within the wash tank that is located generally opposite of the gap with respect to said fluid flow guide surface. The guide surface, support and/or associated gap at least partially isolates impacts, noise or other vibrations acting on the guide surface from acting on the walls of the washing machine wash tank.

In a preferred embodiment, the fluid flow guide surface is capable of alternatively being inserted into and removed entirely from the washing machine wash tank such that a circulating wash action will be created in the washing machine wash tank whether said guide surface is inserted into or removed from the washing machine wash tank. In this manner, the generally rectangular wash tank of the washing machine is utilized with the fluid flow guide surface removed to wash large-sized items such as sheet pans. In one such embodiment, sheet pans, or other items are placed in a rack within the wash tank, such that the items being washed will have fluid circulating around them, but will not also roll within the wash action created within the wash tank. This provides a preferred cleaning action due to the difficulty in rolling larger items. When smaller items, such as pots, pans, produce, etc., are to be washed, the fluid flow guide surface is reinserted into the wash tank.

In other preferred embodiments, the support is also removable from the wash tank. In some embodiments the flow guide surface and/or the support are capable of removal without the use of any tools. This allows for quick and easy insertion of the guide surface and/or support depending upon varying washing needs.

In some embodiments of the instant invention, the fluid flow guide surface and/or the support is generally flexible. In a preferred embodiment, the fluid flow guide surface and/or the support is made of a generally flexible, non-metallic material. The flexible fluid flow guide surface and/or the flexible support, provides for flexible motion of the guide surface (and/or support) that is independent of the walls of the wash tank. Thus, the guide surface can flex to absorb impacts or other vibrations before they are imparted upon the generally nonflexible (rigid) walls of the wash tank. This flexible motion, at least partially, isolates impacts, noise or other vibrations from acting on the walls of the wash tank.

In some embodiments, the support comprises a plurality of interconnected ribs that is placed within the wash tank. The ribs are supported by the bottom wall of the wash tank are, in some embodiments, additionally be supported by one or more of the side walls of the tank. The ribs are not mechanically affixed to the walls of the wash tank, but is instead support through gravity, friction or some other form of non-attachable connection and which does not require any tools for removal. In preferred embodiments, a plurality of separate sections of interconnected ribs are utilized together in a single wash tank. In a preferred embodiment, each separate section includes a separate fluid flow guide surface that corresponds in length to the length of the section. The plurality of sections, in some embodiments, fill the entire wash tank, while in some embodiments they fill just a portion thereof, leaving such portion with the generally rectangular shape of the wash tank. This allows the portion without any section of ribs to be used for washing larger items, such as sheet pans. In a preferred embodiment, the combined length of the sections of ribs within the wash tank are sized to leave one or more voids between adjacent sections. This allows for a divider member to be at least primarily held in place between the two adjacent sections. It will be appreciated that other indexing structures, such as channels or tabs along the walls of the wash tank, may be utilized to further support the divider members, particularly toward the top of the wash tank.

In some embodiments of the instant invention, the fluid flow guide surface includes openings for allowing at least a portion of fluid flow directed from a flow directional opening to pass through the fluid flow guide surface. In some such embodiments, the fluid flow passes from a washing area defined by the fluid flow guide surface into the gap created by the support. In other embodiments, the fluid flow passes through the fluid flow guide surface into the washing area defined by said fluid flow guide surface and opposite the gap.

In one preferred embodiment, at least a portion of said fluid flow guide surface is generally horizontally orientated within the wash tank to create the circulating wash action in the washing machine wash tank about a generally horizontal axis of the wash tank. Such an embodiment is particularly useful for washing machines in which a rolling wash action is intended to be created about the horizontal axis of the wash tank. In an other embodiment, the fluid flow guide surface is generally vertically orientated within the wash tank to create the circulating wash action in the washing machine wash tank about a generally vertical axis of the wash tank. Such an embodiment is particularly useful for washing machines in which the rolling wash action is intended to be created about the vertical axis of the wash tank.

In one embodiment at least a portion of the gap created by the support includes a void that associates with a pumping system intake of the washing machine. The void acts as a manifold to create a flow a fluid generally through the void and into the intake of the machine.

Other embodiments of the invention includes a method of washing items in a continuous motion washing machine, the washing machine including a plurality of flow directional openings each supplying a jet stream of fluid within the washing machine, each jet stream deflecting from at least one wall of or from at least a portion of a removable flow guide structure positioned within the washing machine to provide a washing action, said method comprising the steps of:

isolating a portion of the washing machine by placing at least one member between two of said flow directional openings such that the member divides the washing action within said washing machine;

holding the member within a void created between two adjacent flow guide structures within said washing machine; and capturing at least a substantial portion of the jet stream from at least one of the plurality of flow directional openings within said isolated portion of the washing machine while at least substantially maintaining the jet stream deflection of the washing machine to provide a washing action within said isolated portion of the washing machine.

In one preferred embodiment of the above method said washing machine is a pot and pan washing machine.

Another embodiment of the invention includes a method of washing items in a continuous motion washing machine, the washing machine including at least one flow directional opening supplying a jet stream of fluid within the washing machine, the jet stream deflecting from at least one wall of or from at least a portion of a removable flow guide structure positioned within the washing machine to provide a washing action, said method comprising the steps of:

locating a fluid flow guide surface within the washing machine, wherein at least one region of the surface is contoured inconsistently from the contour of at least one corresponding wall of the washing machine wash tank; and introducing the jet stream within a washing area within said wash tank defined by said fluid flow guide surface, said washing area being generally opposite a gap created between said fluid flow guide surface and at least one wall of the washing machine.

In some preferred embodiments this method further comprises the steps of:

locating an item within said washing area; and orientating an axis of said item generally perpendicular to the jet stream.

In some embodiments, a single flow guide is suspended above the wash tank by one or more flow guide support. In such embodiments, one or more flow guide support is placed into the wash sink. Typically, two flow guide supports are utilized, positioned along opposing sides of the wash sink. The flow guide supports include a receiving element which is configured to receive the flow guide. The receiving element, in some embodiments, is a ledge or a groove sized to receive the flow guide and hold the flow guide in an advantageous geometry for generating a desired fluid flow path. An optional divider allows the resulting wash chamber to be separated into multiple chambers, each with its own characteristics. The flow guide, supports, and divider have relatively flat profiles. Advantageously, such embodiments provide flow guidance and tumbling action upon articles within the wash tank without the addition of a large number of parts. The lower number of parts also reduces time and effort burdens in assembly, washing, and maintenance. Furthermore, the parts which are added are low-profile and require little space to warehouse and maintain. The parts also do not require adjustment while the machine is in service, as the configuration of the parts ensures articles remain within the washing chamber.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION OF THE DRAWINGS

A preferred embodiment of the invention, illustrative of the best mode in which the applicant has contemplated applying the principles, is set forth in the following description and is shown in the drawings and is particularly and distinctly pointed out and set forth in the appended claims.

FIG. 4 is a top side perspective view of the fluid-flow plate insert structure. FIG. 4A is a top plan view of the fluid-flow plate insert structure of FIG. 4. FIG. 4B is a side elevation view of the fluid-flow plate insert structure of FIG. 4. FIG. 4C is a rear elevation view of the fluid-flow plate insert structure of FIG. 4. FIG. 4D is a frontal bottom perspective view of the fluid-flow plate insert structure of FIG. 4.

FIGS. 21a-e depict a method of installing one or more support element in a wash tank according to some embodiments of the present invention.

DETAILED DESCRIPTION

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 2:
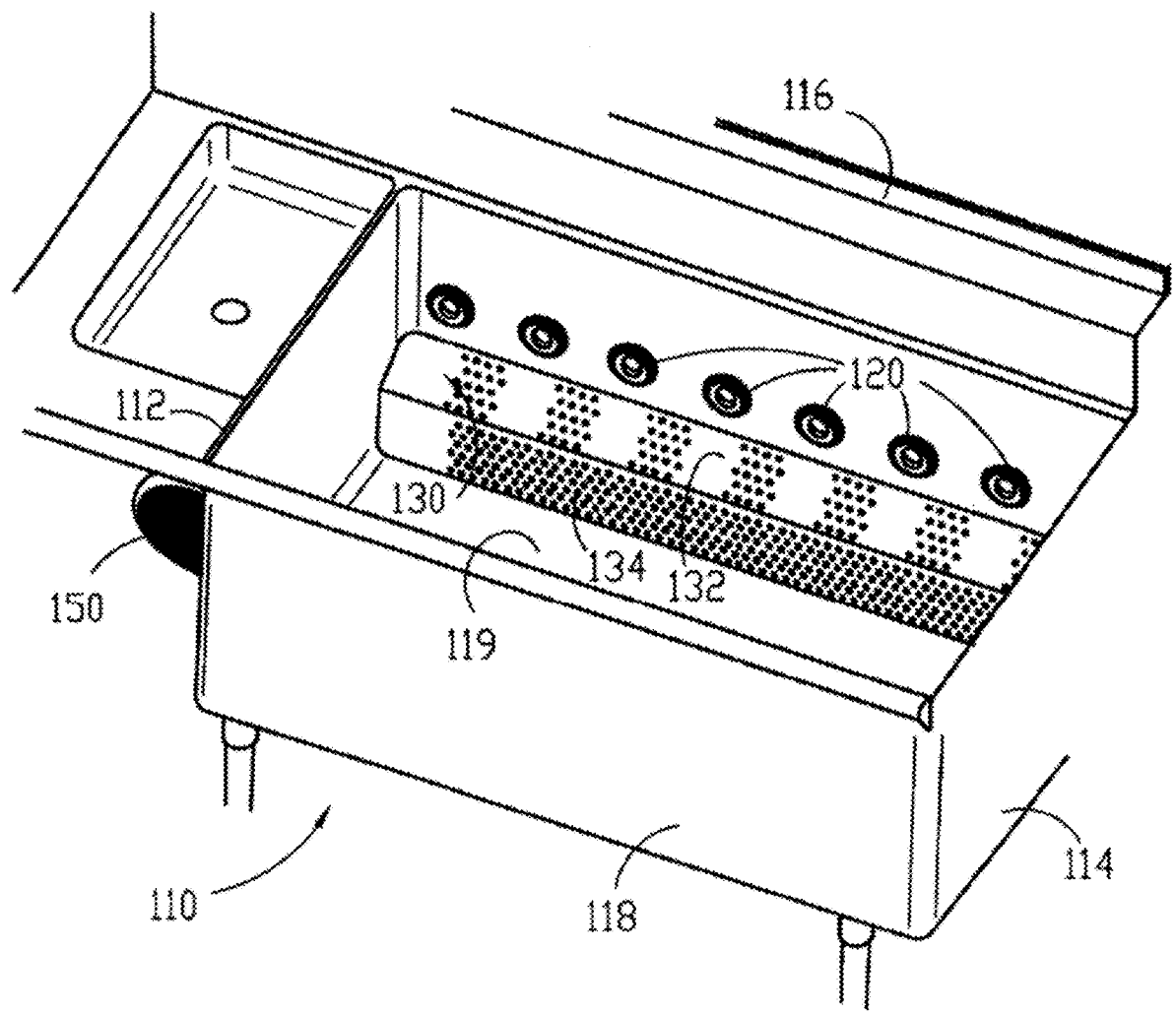
FIG. 2 is a fragmentary perspective view from above of another pot and pan washing machine of the prior art including a generally linear intake manifold, in which embodiments of the instant invention may be incorporated.

Referring to FIG. 2, an embodiment of the instant invention is shown. The generally rectangular wash tank/basin is constructed in essentially the same manner as the wash tanks of the prior art. Wash tank 110 includes left end wall 112, right end wall 114, rear side wall 116, front side wall 118 and bottom wall 119 constructed in the same or similar manner, and of the same or similar materials as the wash tank of the prior art. Pump 150 is attached to left end wall 112 of the embodiment shown, Nevertheless, pump 150 can be attached to either left end wall 112 or right end wall 114 of wash tank 110. In addition it is understood that pump 150 could be attached to any other wall of the wash tank, or otherwise located separate from the wash tank and connected to the interior of the wash tank via a hose or other piping. Flush mounted jet nozzles 120 are mounted along rear wall 116 equally spaced apart from one another. Intake manifold 130 is mounted within wash tank 110 along the bottom portion of rear wall 116, below nozzles 120. Intake manifold 130 includes an upper portion 132 extending outwardly from rear wall 116 toward front wall 118, and lower portion 134 extending from the front end of upper portion 132. In a preferred embodiment, the upper portion of intake manifold 130 is angled downward from rear wall 116. The downward angle of the upper portion of intake manifold 130 corresponds to the downward angle of jet nozzle 120 which directs a fluid path toward the front portion of bottom wall 119, creating a circulating wash action in the wash tank about a generally horizontal axis of the wash tank. Portions of the intake manifold are perforated to allow fluid to be drawn into manifold 130 by the pump.

Figure 3:
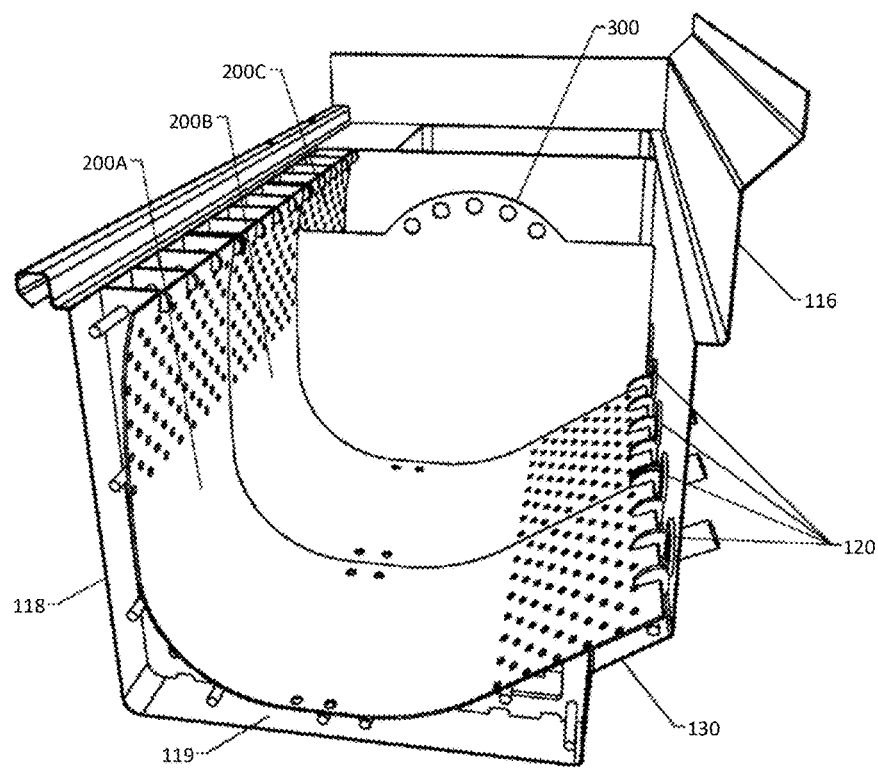
FIG. 3 is a side perspective partial sectional view of several fluid-flow plate insert structures of an embodiment of the instant invention positioned within the wash tank of a pot and pan washing machine of FIG. 2 and including a divider member between two adjacent sections of insert structures.
Figure 5:
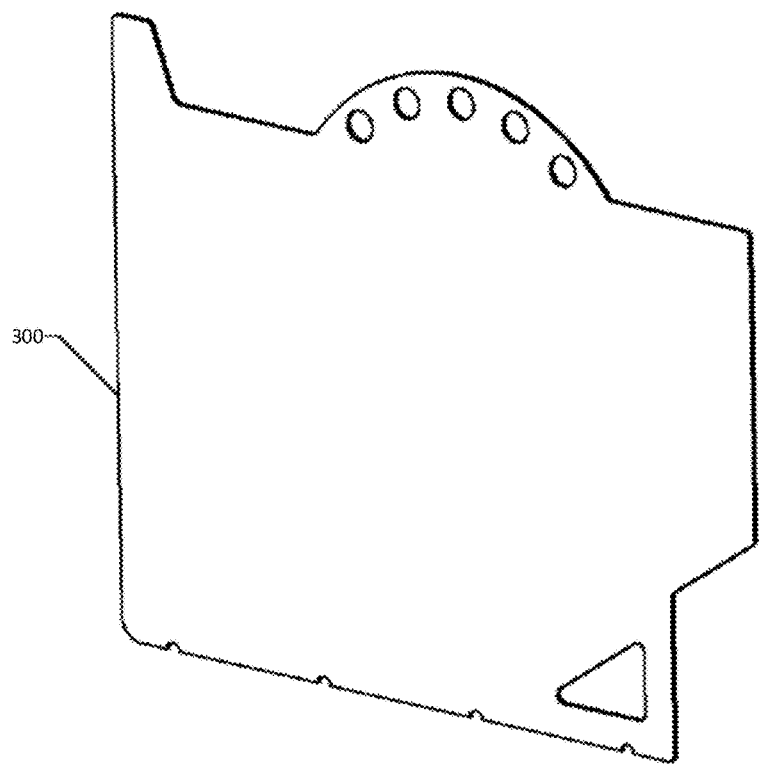
FIG. 5 is a side perspective view of the divider shown in FIG. 3.

Referring to FIG. 3, an embodiment of the instant invention is shown that includes three sections (200a, 200b and 200c) of fluid-flow plate insert structures (illustrated generally in FIGS. 4, 4A, 4B, 4C and 4D) of an embodiment of the invention removably insertable within wash tank 110. Divider member 300 (shown generally in FIG. 5) is positioned in a void or slot between adjacent sections 200b and 200c. The fluid-flow plate insert structures shown in FIGS. 3 and 4 are generally horizontally orientated within wash tank 110 to aid in or create a circulating wash action about a generally horizontal axis of the wash tank.

Figure 4:
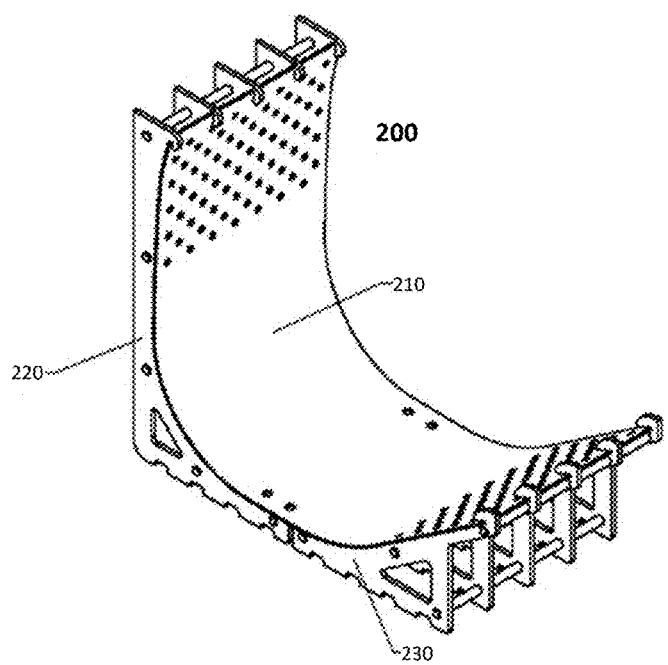
FIGS. 4, 4A, 4B, 4C and 4D are various views of an insert structure of the type shown in FIG. 3.
Figure 4A:
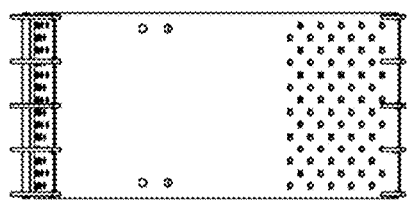
Figure 4C:
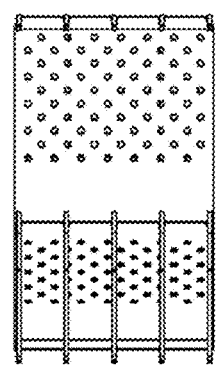
Figure 4B:
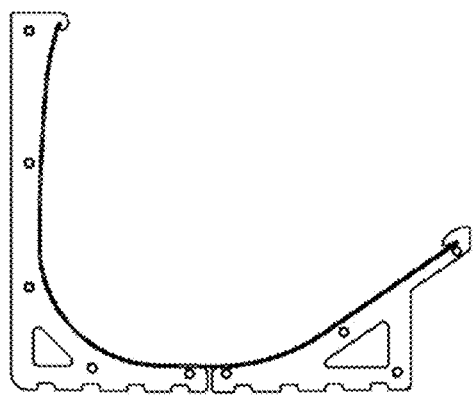
Figure 4D:
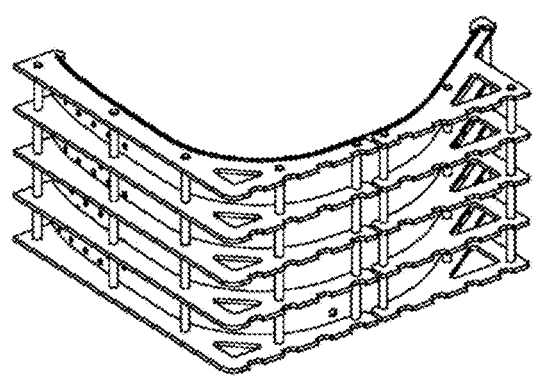

FIG. 4 is a top side perspective view of a fluid-flow plate insert structure 200 generally of the type shown in FIG. 3. FIG. 4A is a top plan view of the fluid-flow plate insert structure of FIG. 4. FIG. 4B is a side elevation view of the fluid-flow plate insert structure of FIG. 4. FIG. 4C is a rear elevation view of the fluid-flow plate insert structure of FIG. 4. FIG. 4D is a frontal bottom perspective view of the fluid-flow plate insert structure of FIG. 4.

Figure 6:
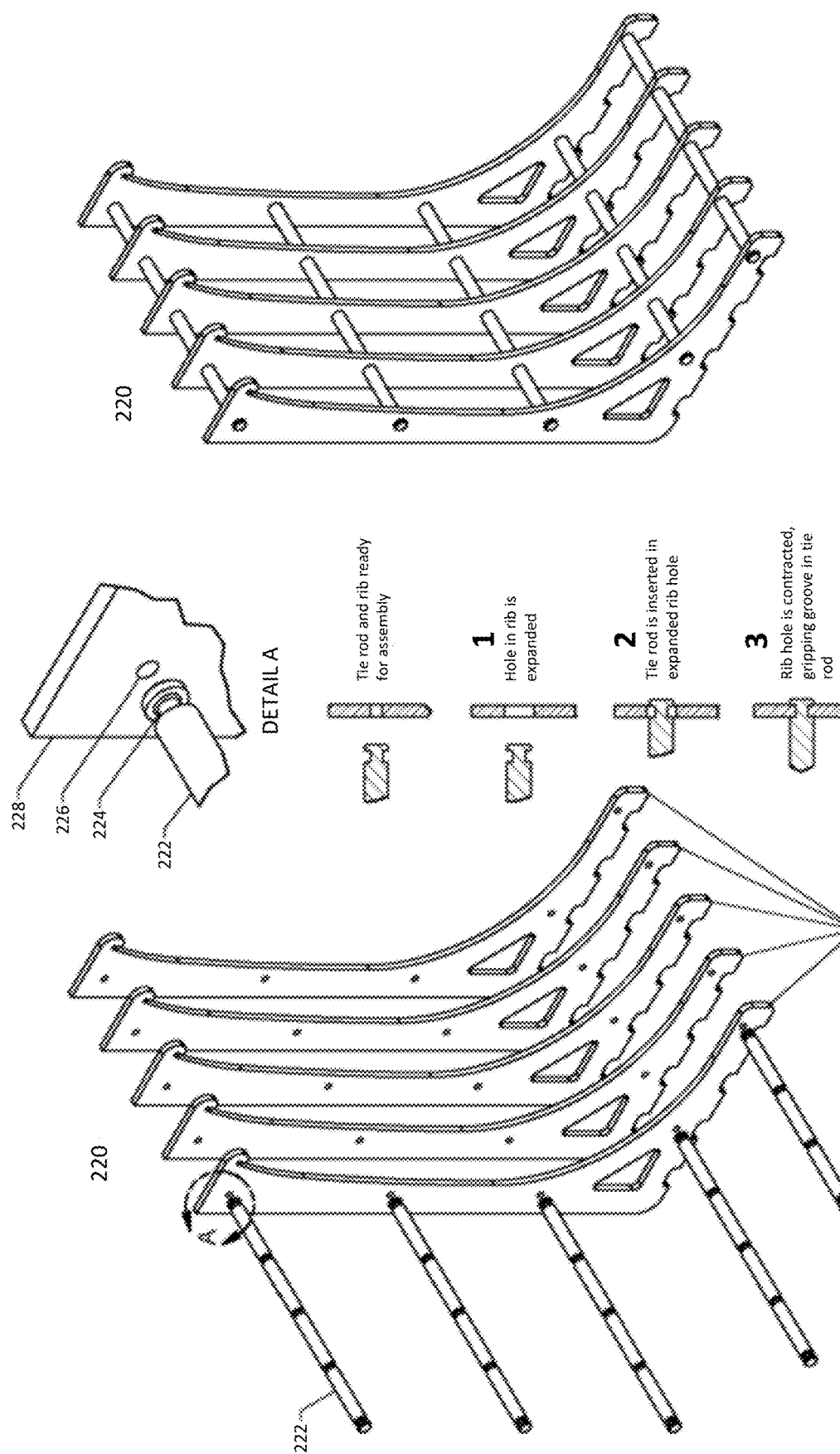
FIG. 6 include perspective views and detailed sectional views illustrating the assembly of an embodiment of a front support structure of the insert structure of FIG. 4.

As is discussed in more detail below, the fluid-flow plate insert structure(s) shown in FIGS. 3 (200a, 200b and 200c) and 4 (200) includes two separate support structures, front support 220 and rear support 230 that are each made up of a plurality of ribs 228, and a curved plate (fluid flow guide surface) 210 that rests on top of the support structures. In one embodiment the ribs are connected together by a plurality of ¼ inch diameter rods that run through holes bored in each rib. A cylindrical spacer is positioned on the rod between each rib and the ribs are held together by bolts on each end of the rod. In another embodiment, as is shown in FIG. 6, the ribs are connected together by a plurality of ½ inch diameter rods 222 that run through holes 226 bored in each rib 228. The rods 222 include annular grooves 224 at spaced intervals along the rods' surface. The diameter of the holes in the ribs through which the rod runs are slightly smaller than the diameter of the ½ inch rod. The material of the ribs is slightly flexible and/or malleable to allow the rib to be slid onto the rod until the rib snaps or engages into the grove and is held tightly in place. In such an embodiment, the spacers and bolts are not needed to connect the ribs together. It will be appreciated that alternative method of connecting ribs of a section may be utilized without departing from the spirit and scope of the instant invention.

Although the fluid flow guide surfaces and support structures in the embodiments shown and described herein are separable from one another, it will be appreciated that embodiments in which the fluid flow guide surface is integral with the support structure are included within the scope of the instant invention. For example, in one such embodiment, ribs similar to those discussed above with respect to FIGS. 3-6 are connected together without the inclusion of a separate plate 210. In such an embodiment, the top curved surface of the ribs themselves act as the fluid flow guide surface. In some embodiments, the ribs include separate front and rear structures as are discussed above. In other embodiments, the front and rear structures are integral with one another. Other embodiments will be readily apparent to those of ordinary skill in the art.

As is discussed above, the fluid-flow plate 200 of FIG. 4 includes a plurality of ribs 228 (including front and rear structures 220 and 230). The ribs are spaced at regular intervals from one another and are fixedly attached to the next adjacent rib. As shown in FIG. 4A, the ribs are arranged such that the fluid-flow plate is generally rectangular in shape when viewed from the top. The fluid-flow plate sections of FIG. 3 (200a, 200b and 200c) are combined together to extend in length from one end wall to the opposite end wall of the wash tank (i.e. 112 to 114). The fluid-flow plate sections of FIG. 3 (200a, 200b and 200c), when viewed from the top, also are combined together to extend from the front to the back of the wash tank. Notwithstanding, it will be appreciated that fluid-flow plate structures that do not extend from end to end and/or from front to back of the wash tank are within the spirit and scope of the instant invention. For example, in one preferred embodiment, only sections 200a and 200b are included in wash tank 100 shown in FIG. 3, leaving the area in which 200c is located to merely include the generally rectangular shape of wash tank 110. This allows items such as a rack of sheet pans to be located in the area for cleaning without the use of insert section 200c, such that the maximum area of the rectangular wash tank may be utilized.

As shown in FIG. 4B, when viewed from the side, each rib includes a curve along the top of the rib such that the rib is much higher at the front (220) of the tank than at the back/rear (230) of the tank. Furthermore, the lowest point of the curve is generally at the middle of the tank, rather than at the front or back. Arranged with a plurality of ribs in parallel, each rib with substantially similar or identical curves, the fluid-flow guide surface 210 positioned on the ribs directs a portion of the fluid along the curve of the combined insert structure 200. The fluid is directed downward along the curve along the lower back portion of the wash tank. Once the fluid reaches the lowest point of the curve of the structure, the fluid is directed upward at the front portion of the wash tank. Some fluid also flows between the ribs in addition to along the curve of the tops of the structure. Thus, the fluid-flow plate provides a more efficient and quieter rolling action within the wash tank and helps to prevent pans and other objects from sticking to and/or striking the bottom of the wash tank.

The fluid-flow plate 200 shown in FIGS. 3 and 4 may be made of any material. In some embodiments, the ribs of the fluid-flow plate and/or guide surface are comprised of a stainless steel or other non-corrosive metal. Preferably, the ribs and guide surface include a material that partially is flexible and absorbs the impact of the pans and/or other objects being washed, such that blemishes ("dings") and noise are reduced. As discussed above, a vibration damping material, such as QUIET STEEL (available from Material Sciences Corporation), nylon, plastic, rubber coating, laminate, or other suitable material may be used. In some embodiments the curved plate and/or the ribs are flexible, in other embodiments the curved plate and/or ribs are rigid.

The fluid-flow plate insert 200 shown in FIG. 4 may be used with any size wash tank. As discussed above, multiple sections of inserts may be combined together to span the entire length of the wash tank, if desired. In addition, varying widths (from front to back) of the fluid flow guide surface 210 may be positioned within supports 220 and 230 to accommodate varying widths of wash tanks. In such manner, front support 220 and rear support 230 will be spaced further apart from one another for larger widths, and closer together to one another for smaller widths.

As is discussed above, the fluid-flow plate 200 includes a curved plate (fluid flow guide surface) 210 that rests on the tops of the two support structures. Each rib in each support structure includes a tab at the high end to receive an edge of the curved plate and maintain its position with respect to the support structure. When viewed from a side, such as shown in FIG. 4B, the curved plate is much higher at the front of the tank and curves downward toward the bottom of the tank at a location between the front and back of the tank. The curved plate curves upward again toward the rear of the tank, as shown in FIG. 4B. The curve is mostly vertical at the front of the tank and between vertical and horizontal at the back of the tank, as shown in FIG. 4B.

The curved plate includes a plurality of apertures toward the front and rear of the tank, as shown in FIG. 19(*e*). In some embodiments, the apertures are large enough, and spaced appropriately, such that a user can insert one or more finger to aid in the adjustment or removal of the curved plate within the tank. In other embodiments, the holes also help to accommodate surge in the wash level during operation of the machine. In still other embodiments, holes in the curved plate allow the fluid flow from the flow directional openings to be directed through the curved plate either into the wash area defined by the plate or into the gap created between the curved plate 210 and the walls of the wash tank by the support structure. In some embodiments, the rear apertures are sized and shaped to allow fluid to flow from the wash area through the apertures and into an intake manifold. In another embodiment, the pattern of apertures toward the rear portion of the curved plate are identical to that toward the front of the plate. In this manner, the insert of the instant invention may be easily assembled in either direction with no change in performance. In one such embodiment, the pattern includes both smaller apertures and larger apertures as are discussed above.

The fluid-flow plate 200 as shown in FIGS. 3 and 4 is a modular unit to accommodate different sized wash tanks. In the case of a wash tank with a longer length, front to back, the same support structures may be used by replacing the curved plate with a curved plate of longer length (front to back). In the case of a wash tank with a longer width, side end to side end, multiple support structures and curved plates are used side by side. In this manner, the fluid-flow plate as shown in FIGS. 3 and 4 can accommodate a large variety of wash tank sizes and configurations. The fluid-flow plate may be removed entirely from the wash tank and thus is compatible with other pot and pan washing systems.

In a preferred embodiment, the fluid-flow plate 200 shown in FIGS. 3 and 4 is inserted into the wash tank of a pot and pan washing machine by first placing the front support structure 220 in the bottom of the wash tank along the front wall of the wash tank and the back support structure 230 in the bottom of the wash tank along the rear wall of the wash tank. The curved plate 210, which originally is made of a generally flat material (such as a piece of sheet metal or plastic) is then inserted into the tabs at the high ends of the front and back support structures and curved to conform to the shape along the top surfaces of the support structures. The tension created by the curving of the plate causes the front and back support structures to be urged away from one another such that the front edge of the front support structure is pressed against the front wall of the wash tank and the rear edge of the rear support structure is pressed against the rear wall of the wash tank. This tension holds the fluid-flow plate in position within the wash tank. In alternative embodiments, the curved plate 210 is inserted into the support structures (220 and 230) prior to insertion of the fluid flow plate structure 200 into the wash tank.

In some embodiments the ribs of the front support structure are design to be able to overlap the ribs of the back support structure when installed in a wash tank. This occurs when the combined width (i.e. front to rear of a wash tank and/or fluid-flow plate) of the front and back support structures is greater than the width of the wash tank. In such embodiments, the ribs of the front support structure must be slightly offset from the ribs of the back support structure to account for the overlap. In use, the larger the width of the tank, the wider the curved plate. The wider curved plate causes the opposing ends of the front and back support structures to be urged further apart from one another thereby accommodating a wider wash tank. In a preferred embodiment the front and back/rear support structures are identical to each other. The only difference is the width of the curved plate that is inserted. The larger the width of the tank, the wider the curved plate. The wider curved plate causes the opposing ends of the front and back support structures to be urged further apart from one another thereby accommodating a wider wash tank.

Figure 1:
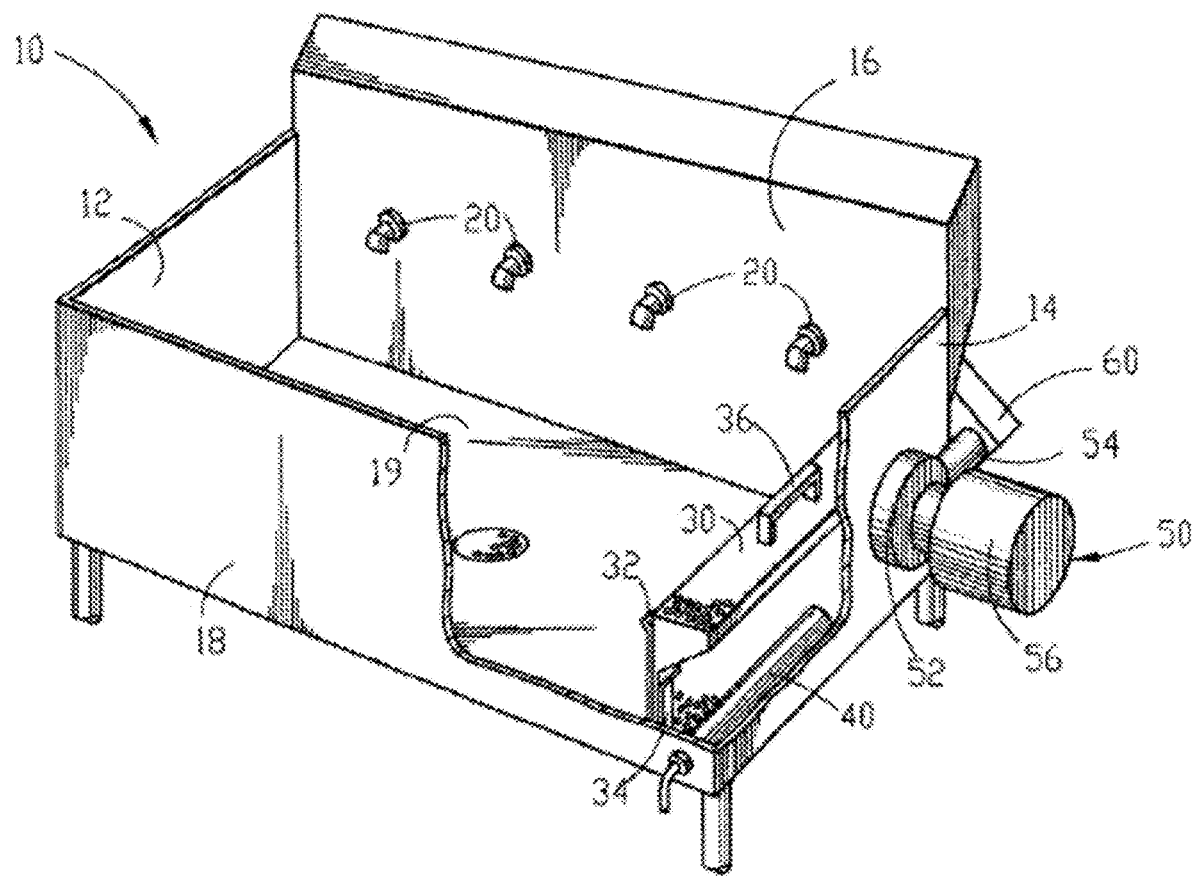
FIG. 1 is a partial perspective view of a pot and pan washing machine of the instant invention and in which embodiments of the instant invention may be incorporated.

As is shown in FIG. 4B, the ribs of both the front and back support structures each include scallops along the edges of the ribs that are placed in contact with the bottom wall of the wash tank. In alternative embodiments, scallops may be included in other surfaces (i.e. along the bottom edge of both ribs and/or along the front edge of the front rib and/or along the rear edge of the rear rib). In addition, both ribs includes a number of holes or voids through the ribs. The scallops and holes/voids all act to cushion impacts from pots and pans and to reduce noise transmission. In a preferred embodiment, in which the fluid flow plate insert structure is utilized in connection with the wash tank 10 embodiment shown in FIG. 1, which includes an intake on the end wall of the wash tank, the holes/voids in the support structure allow fluid to flow freely through/around the ribs. In such embodiment, the holes/voids act as an intake manifold for the pumping system.

As is discussed above, the fluid flow plate structure 200 is a modular unit to accommodate different sized wash tanks. In the case of a wash tank with a longer width, front to back, the same support structures may be used by replacing the curved plate with a curved plate of longer length (front to back) as is discussed above. In the case of a wash tank with a longer length, side end to side end, multiple support structures and curved plates are used side by side. In this manner, the fluid-flow plate structure 200 can accommodate a large variety of wash tank sizes and configurations. The fluid-flow plate may be removed entirely from the wash tank and thus is compatible with other pot and pan washing systems.

In the embodiment shown in FIG. 3, three separate fluid-flow plate insert structures (200*a*, 200*b* and 200*c*) are utilized in a single wash tank. The three insert structures are placed side by side in the bottom of the wash tank in the manner described above. The combined length of the curved plates of the three insert structures is slightly less than the length (side end to side end) of the wash tank of the washing machine. This creates a slot or gap between the ends of adjoining insert structures and/or between an end of the insert structure(s) and the end wall of the wash tank. The dimension of the slot/gap/void is sized to accommodate a divider member, such as a metal or plastic member similar to that described in U.S. Pat. No. 7,523,757 the entire disclosure of which is incorporated herein by reference. The location of the slot/gap may be changed by the operator of the machine by changing the location of the three insert structures within the wash tank. In some embodiments, two of the insert structures are of equal length side to side as each other and are substantially longer than the third insert structure. This allows for a variety of different arrangements of the insert structures and the divider member within the wash tank to create a variety of isolated portions or areas within the wash tank. When not in use, the divider and gap can be positioned to be abutted against one of the end walls of the wash tank in the slot between the left end wall and the three insert structures. This results in a generally open wash tank arrangement (i.e. no isolated portions of the wash tank) and provides a convenient storage location for the divider member. It will be appreciated that the locations of the three inserts may be manipulated in a variety of different ways in addition to those shown and discussed here (for example, the shorter insert structure may be located in the middle of the two longer insert structures). In addition, it will be appreciated that the number of insert structures may either be increased or decreased to provide a variety of different arrangements within the wash tank. Further, it will be appreciated that the combined length of the curved plates of the insert structures may be manipulated to allow for multiple divider members within a single wash tank.

Figure 7:
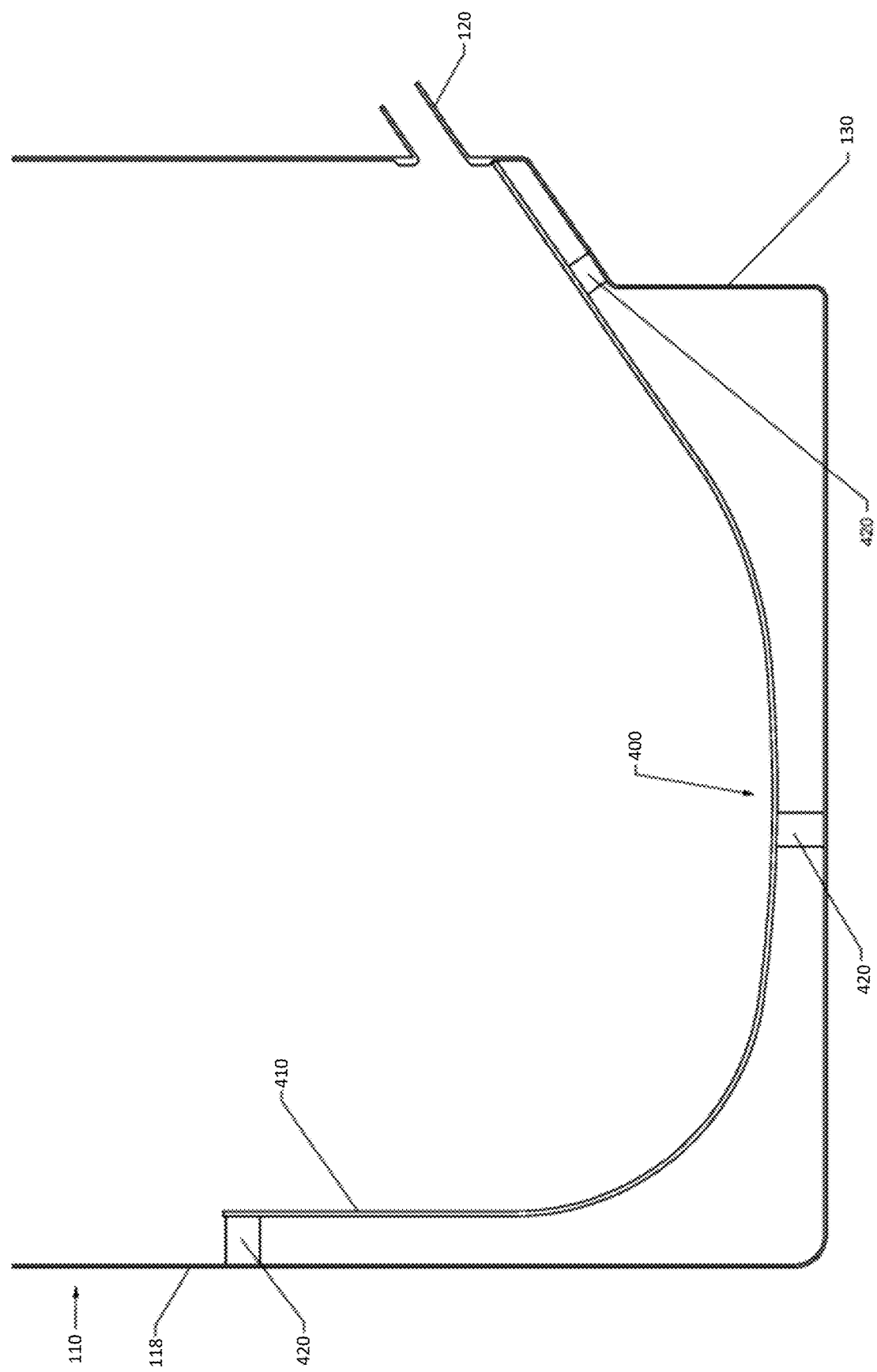
FIG. 7 is a side sectional view of another embodiment of a fluid-flow plate insert structure shown positioned within the wash tank of the pot and pan washing machine of FIG. 2.

Referring to FIG. 7 a side sectional view of another embodiment of a fluid-flow plate insert structure 400 is shown positioned within the wash tank of a pot and pan washing machine. In the embodiment shown in FIG. 7, the support structure for the curved plate 410 includes a plurality of bumpers 420 located within the wash tank to create spacing between the walls of the wash tank 110 and the curved plate 410 of the fluid-flow plate insert structure. The curved plate is attached to the bumpers via glue, welding or any other suitable attachment mechanism now known or hereinafter developed. In the embodiment shown, the bumpers are made of a rubber or plastic material to increase noise dampening. Nevertheless, it will be appreciated that any other suitable material for the bumpers may be utilized without departing from the spirit and scope of the instant invention. In the embodiment shown, each of the bumpers generally span the length of the wash tank from side to side. Nevertheless, it will be appreciated that shorter bumpers and/or that a plurality of bumpers spaced along the length of the wash tank may be utilized without departing from the spirit and scope of the instant invention.

Figure 8:
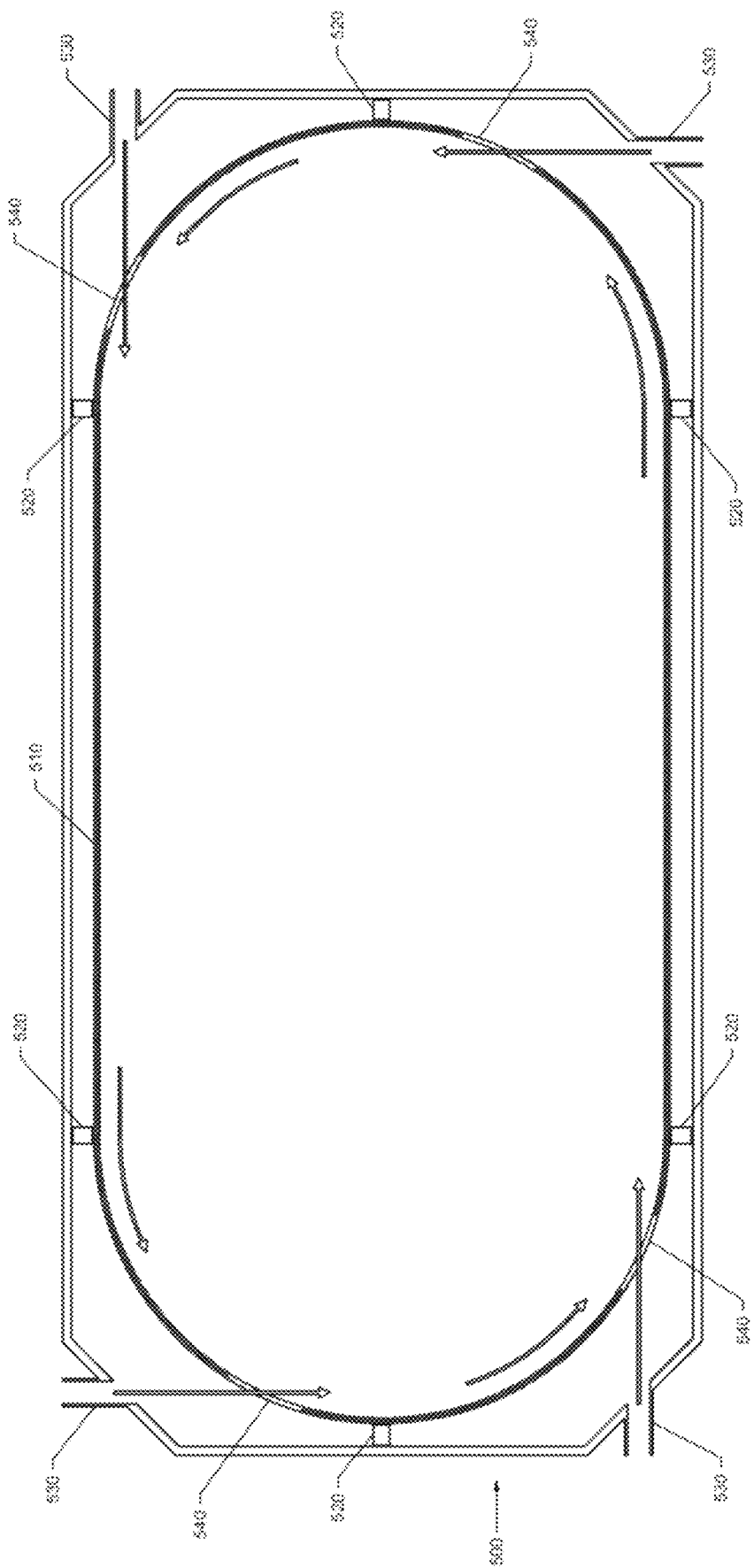
FIG. 8 is a top plan view of a pot and pan washing machine of the instant invention including a fluid-flow plate insert structure that is generally vertically orientated.

Referring to FIG. 8, a generally vertically orientated guide surface 510 is shown. The guide surface of FIG. 8 creates or improves a circulating wash action in the wash tank 500 about a generally vertical axis of the wash tank. The guide surface 510 is a generally closed or continuous elliptical planar looped member that is supported in a vertical position within wash tank 500. Support members or feet 520 help to support guide surface 510 and to maintain a gap or spacing between guide surface 510 and the walls of wash tank 500. The fluid flow guide surface 510 defines a washing area within the interior of the wash tank at the interior of the ellipse of the guide surface 510. The washing area is generally opposite the gap created between the fluid flow guide surface 510 and the walls of the wash tank 500. Jets 530 are angled create a circulating fluid flow within the wash tank 500. Openings 540 in the fluid flow guide surface 510 are located in association with each jet to allow the fluid flow to pass through openings 540 and into the washing area defined by the fluid flow guide surface 510.

Figure 9:
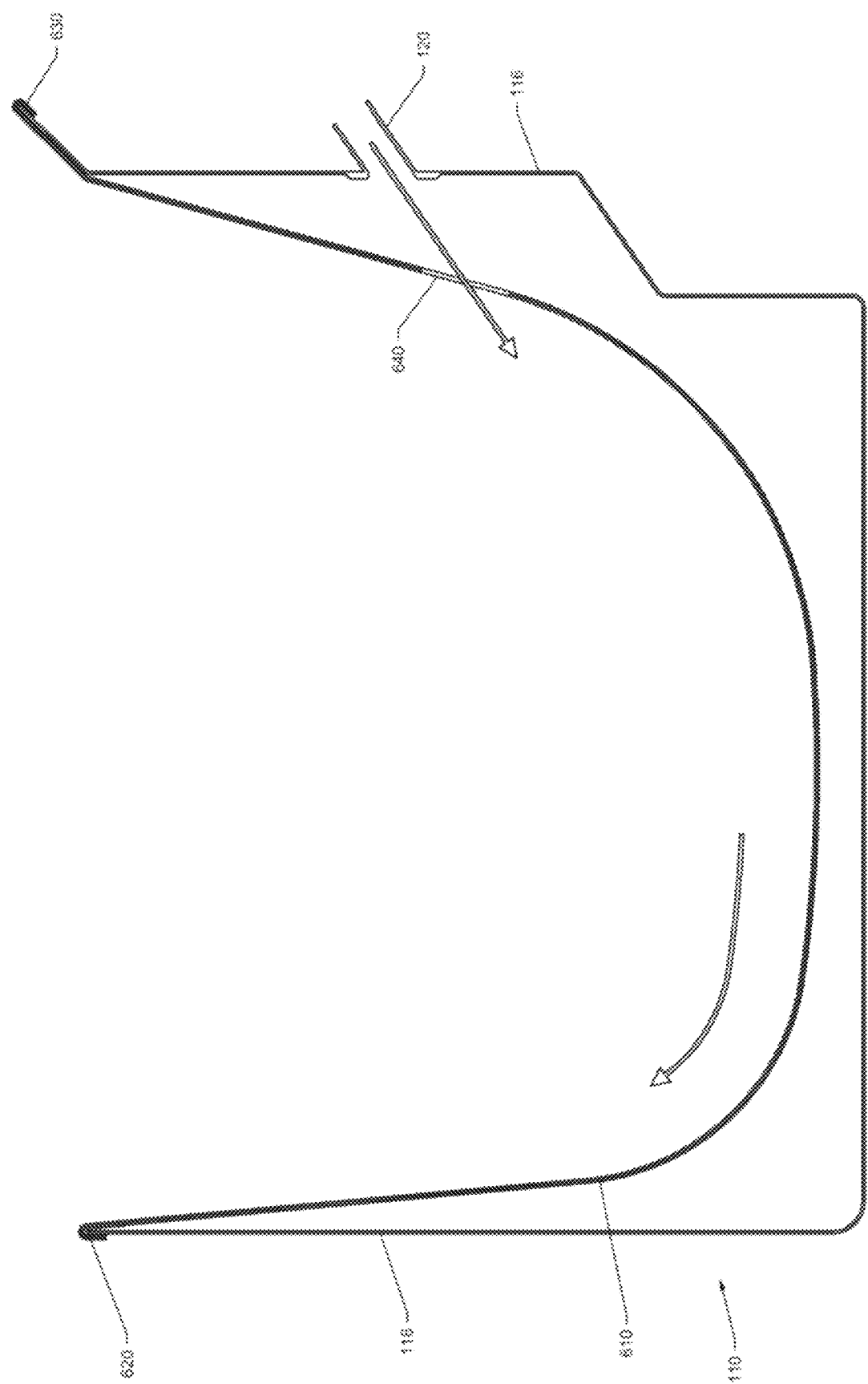
FIG. 9 is a side sectional view of another embodiment of a fluid-flow plate insert structure shown positioned within the wash tank of the pot and pan washing machine of FIG. 2.

Referring to FIG. 9, another embodiment of a generally horizontally orientated guide surface 610 is shown in connection with wash tank 110. The guide surface of FIG. 9 creates or improves a circulating wash action in the wash tank 110 about a generally horizontal axis of the wash tank. The guide surface 610 is removably supported within wash tank 110 via supports 620 and 630. Supports 620 and 630 are channels or hooks that basically hook over the lips at the top of the front and rear walls (respectively) of the wash tank. Openings 640 in the fluid flow guide surface 610 are located in association with each jet 120 of wash tank 110 to allow the fluid flow to pass through openings 640 and into the washing area defined by the fluid flow guide surface 610.

Figure 10:
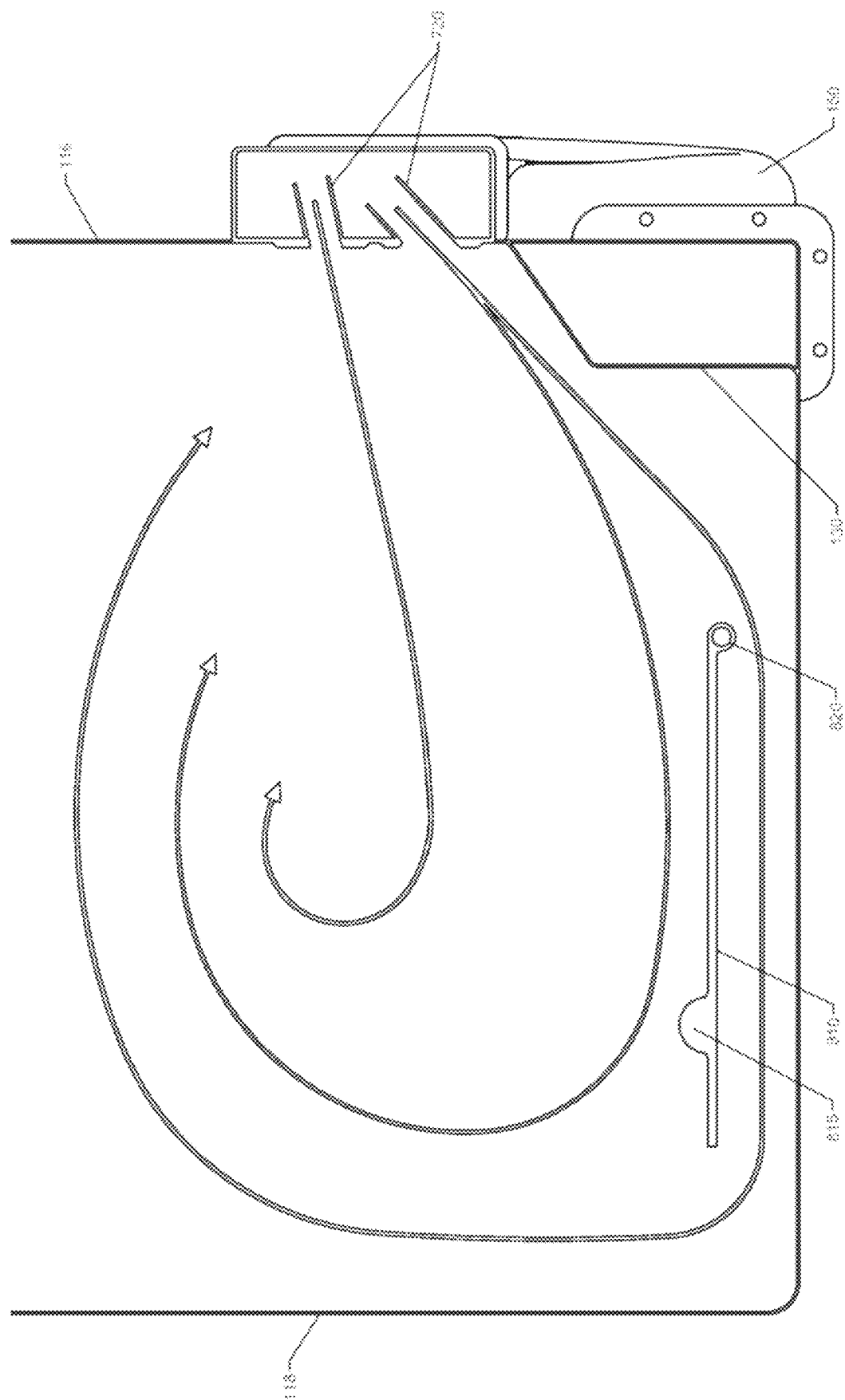
FIG. 10 is a cross-sectional side view of another embodiment of a fluid-flow plate insert structure shown positioned within the wash tank of the pot and pan washing machine of FIG. 2 that includes arrows indicating fluid flow paths within the wash tank.

FIG. 10 shows a pot and pan washing machine with a fluid-flow plate 810 at the lower portion of the wash tank 110. As shown in FIG. 10, the fluid-flow plate is generally rectangular in shape and extends in length from one end wall to the opposite end wall. As shown in FIG. 10, the fluid-flow plate includes a ridge 815 extending the length of the fluid-flow plate, parallel to the front and rear side walls of the wash tank. The ridge is located at an end opposite the jet nozzles 720 and/or rear side wall 116. The fluid-flow plate is pivotally attached to each of the opposite end walls via pivotal support 820. The fluid-flow plate 810 is generally planar. Although the fluid-flow plate is shown generally parallel to the bottom wall of the wash tank in FIG. 10, the end nearest the front side wall can move up or down in wavelike motions with fluid flow because the fluid-flow plate is attached to the wash tank only at one end, the end nearest the rear side wall.

FIG. 10 shows arrows indicating fluid flow paths within the wash tank. As shown in FIG. 10, fluid flow initiates from the jet nozzles 720 at the rear side wall 116. The jet nozzles are located at varying heights along the length of the rear wall of the wash tank, and discharge fluid at varying predetermined angles. As is shown in FIG. 10, a portion of the fluid is discharged at an angle to force the fluid flow under the fluid-flow plate. Fluid following this path flows under the fluid-flow plate and between the fluid-flow plate and the bottom wall. When the fluid hits the front side wall, the fluid is forced upward along the front side wall. The fluid eventually circulates along the top of the wash tank back toward the rear side wall and intake manifold.

As shown in FIG. 10, a portion of fluid is discharged at a downward angle toward the top of the fluid-flow plate. This fluid is then forced along the top of the fluid-flow plate until it reaches the ridge. When it reaches the ridge, the fluid is forced upward toward the top of the wash tank by the ridge. The fluid eventually circulates along the top of the wash tank back toward the rear side wall and intake manifold.

Also as is shown in FIG. 10, a portion of the fluid is discharged at an angle generally forward toward the front wall of the wash tank. This fluid jet stream is not intended to deflect from either the bottom of the wash tank or from the fluid-flow plate. It will be appreciated that although shown as a generally downward angle, the forward fluid flow angle may be generally level, generally level or generally upward without departing from the spirit and scope of the instant invention. In a preferred embodiment, the forward fluid flow is a piercing flow that comprises a generally lower volumetric flow rate than the portions of fluid that are discharged downward toward or under the fluid-flow plate. In this manner the piercing flow aids in rotation of items being washed and performs the majority of washing.

Depending on the force of the fluid under the fluid-flow plate compared to the force of the fluid along the top of the fluid-flow plate, and also depending on whether other items (e.g. pots and pans, produce, etc.) are colliding with the top of the fluid-flow plate, the fluid-flow plate of FIG. 10 oscillates in an up and down motion at the front end. The location of the fluid-flow plate and/or the oscillating motion of the fluid-flow plate helps to prevent pans and other items from sticking and/or striking to the bottom of the wash tank, thus providing a more efficient and quieter rolling action within the wash tank.

In one embodiment, the fluid-flow plate(s), discussed above in connection with any of the embodiments discussed in connection with any of FIGS. 1-10, is (are) made from stainless steel. In another embodiment, the fluid-flow plate and/or other components of the wash tank are made from a vibration damping material, such as QUIET STEEL (available from Material Sciences Corporation), plastic, or other suitable material. As objects are washed and turned in the rolling motion of the wash tank, they frequently collide with the front and bottom. Such collisions can cause elevated decibel levels. A wash tank made of ordinary stainless steel combined with a fluid-flow plate made from a vibration damping material will keep noise levels within more tolerable limits as the pots and pans or other items will strike the fluid-flow plate rather than the bottom of the wash tank. Moreover, the pivotal connection or oscillating/flexible motion of the fluid-flow plate itself dampens the impact between pots and pans and the fluid-flow plate.

In one embodiment of the fluid flow plate of FIG. 10, a single plate 810 spans the length of the wash tank. In another embodiment, multiple plates are positioned side by side to cover generally the entire lower portion of the wash tank. Each fluid-flow plate is generally rectangular in shape and extends in width generally from the rear wall to the front wall of the wash tank. Each fluid-flow plate extends in length a portion of the length between the end walls of the wash tank, such that the multiple fluid-flow plates positioned side by side fully cover the entire width of the wash tank. Each fluid-flow plate is separately mounted to the wash tank, to allow each plate to oscillate independently from one another. It will be appreciated that the size, shape, number and other structural elements (such as openings) of each or several individual plate(s) may vary without departing from the spirit and scope of the instant invention. Moreover, it will be appreciated that a single type of fluid flow plate may be utilized in the wash tank, combinations of various types of fluid flow plates may be utilized in the wash tank, or portions of the wash tank may utilize no fluid flow plate at all.

In an embodiment similar to that of FIG. 10, the fluid flow plate 810 is connected to the rear wall 116 or intake manifold 130 of the wash tank and extends generally toward the front wall 118. A first, generally circular opening is located toward the end of the plate that is located along the rear wall of the wash tank (i.e. closest to the jets of the wash tank). This opening is sized to allow a jet stream from jets that are angled downward to flow through the opening and under the plate (similar to the flow shown in FIG. 10). A plurality of small, oval-shaped, openings are located toward the front end of the plate opposite the rear wall of the wash tank. These openings allow the fluid that is flowing under the plate to be directed upward toward the front of the wash tank (similar to the flow shown in FIG. 10). A pair of generally rectangular openings is located toward the rear-most end of the plate to allow the plate the be attached to tabs/fingers that are protruding from/near the rear wall of the wash tank. In this manner, each plate is mounted within the wash tank to allow the plates to oscillate independently from one another. In one embodiment, the fingers on which the plates are mounted include a gap at the top (between the finger and the rear wall or intake of the tank), such that the plates may be attached or removed by system users. In an alternative embodiment, no gap exists, such that the plates are permanently mounted within the wash tank. In one embodiment, one of multiple plates within the wash tank differs from the remaining plates. The one plate that differs from the other plates is twice as wide as the other plates described above. One half of the width of the plate includes holes that are identical to those described above. The other half includes only the rectangular mounting holes. The remainder of the plate includes no openings. This section of the plate is intended to generally maintain the wash action created by the jets without allowing any portion of the fluid expelled from the jets to flow under the plate. Such an arrangement, in some embodiments, is utilized in connection with a wash tank in which a powered utensil basket is utilized that itself captures a jet stream within the basket.

In another embodiment similar to those discussed above with respect to FIG. 10, each flow plate is attached to the rear wall of the wash tank via a c-channel bracket that clamps around the top and bottom of the rear end of the plate. The bracket is attached to the rear wall of the wash tank via tabs or hooks on the bracket that correspond to mating tabs, notches or hooks on the rear wall of the wash tank. In one embodiment, tabs/hooks on the bracket are inserted into slots/notches located in an intake grate that extends along the rear wall of the wash tank.

In another embodiment similar to that of FIG. 10, each plate extends from the rear wall of the wash tank and fades into the radius of a tank insert that extends from the top of the front wall of the wash tank downward along the inner surface of the front wall of the wash tank, and then along the bottom of the wash tank toward the rear wall of the wash tank. The radius portion of the tank insert creates a segregated area between the front bottom corner of the wash tank and the insert. The insert includes a jog section toward the top of the front wall to create a gap between the front wall of the wash tank and the front of the insert. The gap extends down into and merges with the segregated area. This segregated area (and gap) will retain generally static fluid (i.e. fluid that does not exhibit as high a degree of flow as fluid on the interior side of the insert) from the wash tank due to holes in the insert and/or unsealed gaps between the walls of the wash tank and the edges of the insert. The generally static fluid acts as a hydraulic damper to reduce noise when a pot, pan or other item being rotated within the interior section of the insert strikes a surface of the insert.

In one embodiment discussed above, the bottom wall of the tank insert becomes generally flush with the bottom wall of the wash tank and extends to the rear wall of the wash tank. Nevertheless, it will be appreciated that in some embodiments a gap is created between the bottom wall of the wash tank and the bottom wall of the insert to increase noise reduction from pot, pan or other items striking that area. In some embodiments, a gap is provided between the fluid flow plate and the bottom wall of the insert. This gap too acts as a hydraulic damper in the same or similar manner to the flow plates of embodiments discussed above. Fluid flows from the jet of the wash tank through the hole in the rear of the flow plate and underneath the flow plate toward the front wall of the wash tank. The fluid follows the radius of the insert upward and urges the front of the flow plate upward as it flows out from under the flow plate. This cause the flow plate to oscillate in the same or similar manner discussed above with respect to other embodiments.

In one embodiment in which a separate utensil flow plate for a utensil washing area differs from other flow plates within the wash tank, the utensil plate is attached to the rear wall (or rear intake grate) of the wash tank in the same or similar manner to plates discussed above via a c-channel bracket. The utensil plate extends from the rear wall of the wash tank toward the front wall of the wash tank. The utensil plate curves upward toward the front wall of the wash tank to create a radius and segregated area (and gap) similar to that of the wash tank insert discussed above. The front end of the utensil plate includes a lip that hooks into a channel or shelf ridge located in a support bracket for a wash tank partition plate. The front portion of the utensil plate tapers upward from an end of the wash tank toward the interior of the wash tank. This creates a ramp from the end of the wash tank toward the interior of the tank. As fluid flows from the jets across the top of the utensil plate, the ramp urges the fluid toward the interior of the wash tank. This results in utensils and other items that are located in the utensil area (i.e. above the utensil plate and between the end of the wash tank and the partition plate) to be urged upward toward the front of the wash tank and against the partition plate, such that the items are easily retrieved from the wash tank by an operator.

In another embodiment the divider discussed above is held in position within the wash tank via a pair of support brackets. A first support bracket is located along the front wall of the wash tank. The front bracket includes a lip that wraps around the top of the front wall of the wash tank to hold the bracket in position. A rectangular body extends downward from the lip along the interior of the front wall of the wash tank. The body includes a pair of rails that form a slot in which the divider/partition is retained. The rear bracket includes a body section that also includes rails that form a slot for retaining the rear end of the divider. The rear bracket is attached to the rear wall of the wash tank via interconnecting hooks or tabs.

Although the gap created between the fluid flow guide surface by the supports in all of the embodiments shown in FIGS. 1-10 herein, include voids in which fluid will flow or stand when the wash tank is full of fluid, it will be appreciated that other embodiments include no such voids. For example, in one embodiment, the support for the guide surface is made of a solid piece of material that includes an exterior shape that abuts against the walls of the wash tank, and an interior shape that is contoured to define the desired wash area within the fluid flow guides surface.

The location and shape of the fluid-flow plate structure and/or the oscillating or flexing motion of the fluid-flow plate structure of the embodiments discussed above with respect to FIGS. 1 through 10 helps to prevent pans and other items from sticking and/or striking to the bottom of the wash tank, thus providing a more efficient and quieter rolling action within the wash tank. This results in an improved flow pattern within the wash tank, faster washing due to items being located in front of the wash jets more times and at different orientations, and increased wash efficiency with more items being washed in less time. In addition, the improved flow allows items to be delivered to operators of the machine as it pushes items toward the top and front of the wash tank.

Figure 11:
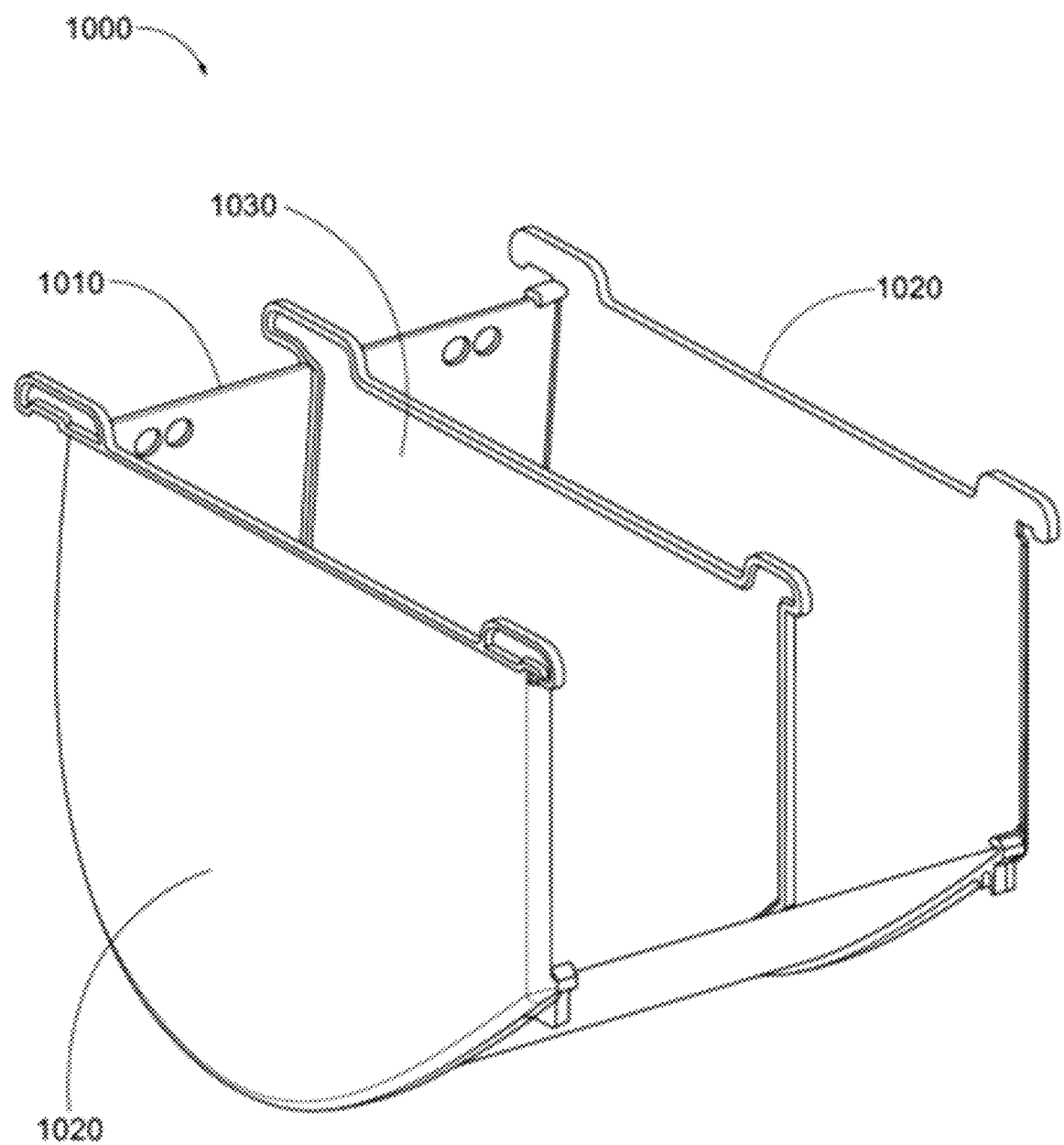
FIG. 11 is a perspective view of a fluid-flow plate insert structure according to some embodiments of the present invention.
Figure 15:
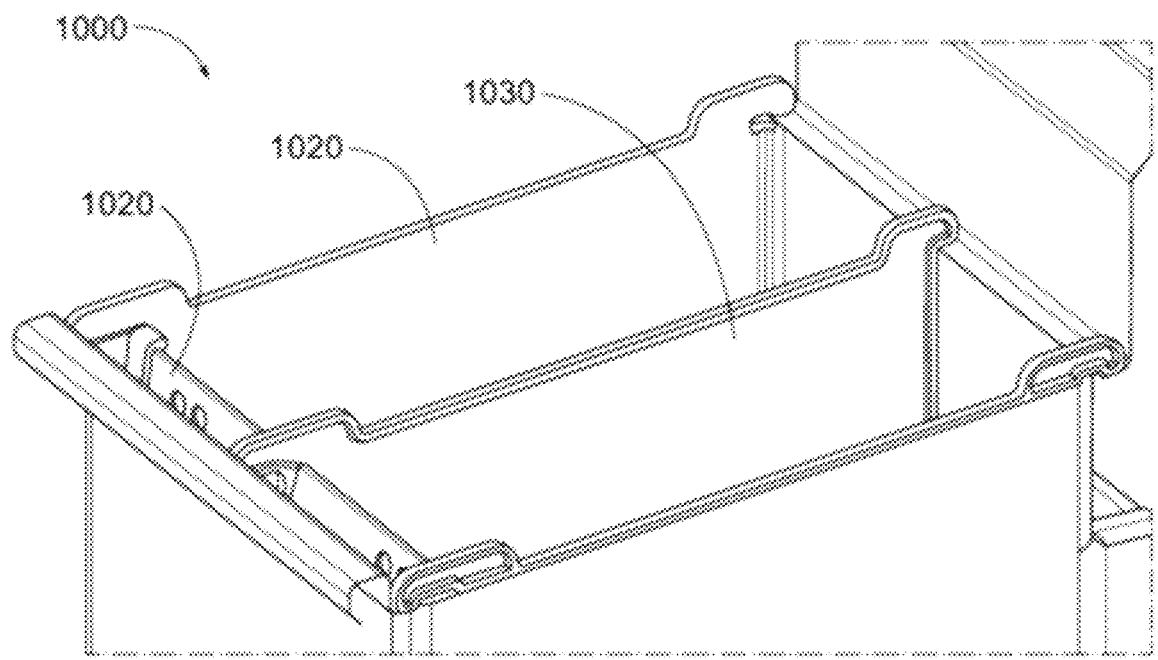
FIG. 15 is a perspective view of a pot and pan washing machine of the present invention including a fluid-flow plate insert structure.

Referring to FIG. 11, in some embodiments, a streamlined fluid-flow plate insert structure 1000 is considered. In some embodiments, the fluid-flow plate insert structure 1000 includes a flow guide 1010 and one or more support elements 1020. In some embodiments, one or more divider 1030 is included in the fluid-flow plate insert structure 1000. The fluid-flow plate insert structure 1000 is configured to be selectively placed within a wash tank and supported by one or more surface of the wash tank, such as depicted in FIG. 15. The support elements 1020 bear the weight of the structure 1000 and provide guidance to shape the fluid-flow guide 1010. The resulting shape of the fluid flow path diverts the flow of fluid within the wash tank, providing a rolling washing action within the tank to provide a superior washing action within the wash tank. The optional divider 1030 enables selectively modifying the size the washing chamber. In some embodiments, the divider 1030 allows for selective flow rate within each chamber, allowing for selective washing action within each chamber.

Referring to FIGS. 12a-d, in some embodiments a flow guide element 1010 is included. In some embodiments, the flow guide element 1010 is a sheet of flexible yet resilient material, such as a metal sheet or thermoplastic. In some embodiments, the flow guide element 1010 includes a top and bottom surface, and in some embodiments the surfaces are substantially mirrors of each other, such that the flow guide element 1010 is reversible and enables assembly in either direction without impacting performance.

In some embodiments, the surface includes a plurality of holes and/or apertures 1012. In some embodiments, the holes 1012 are sized in a uniform manner, while in other embodiments the holes 1012 are of different sizes. In some embodiments, one or more of the holes is a receiving hole 1014 for one or more optional divider 1030. The receiving hole 1014 is sized to receive a projection 1039 of the divider 1030, such as to secure the divider 1030 relative to the flow guide element 1010. In some embodiments, the holes 1012 are sized such that fluids pass through the holes 1012 while the articles are unable to pass through the holes 1012. In some embodiments, the holes 1012 are sized such that fluid and food particles flow through the holes 1012 while articles are unable to pass through the holes. Thus, the holes 1012 provide support for the articles being washed while allowing fluid and waste particles to be removed from the chamber in which the articles reside.

In some embodiments, the flow guide element 1010 has two opposing lengthwise edges and two opposing widthwise edges. The lengthwise edge is dimensioned such as to coincide with the desired length of a flow path for the wash tank fluid. The lengthwise edge is relatively thin, in some embodiments, and is configured to coincide with one or more receiving element 1024 of one or more support element 1020. In some embodiments, the flow guide element 1010 is configured to resiliently deform along the lengthwise edge to match the profile of such receiving elements 1024.

Figure 16A:
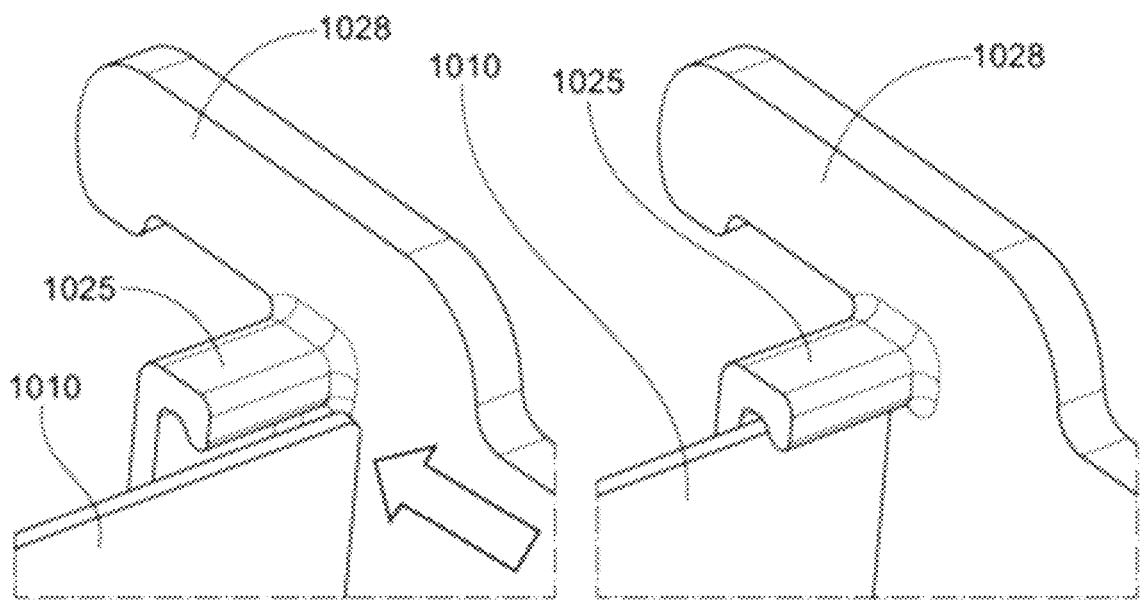
FIGS. 16a and b are perspective detail views of a flow guide element interfacing with a hook of a receiving element of a support element.

In some embodiments, the flow guide element 1010 has two opposing widthwise edges. In some embodiments, the widthwise edge is dimensioned such as to coincide with the space between receiving elements 1024 of one or more support element 1020 when the support element 1020 interfaces with the wash tank. In some embodiments, the widthwise edge includes one or more projection (1016, 1018). In some embodiments, two projections are positioned on the widthwise edge proximate to each of the opposing lengthwise edges. In some embodiments, one or more of such projection is a securing tab 1016. In some embodiments, the securing tab 1016 is configured to interface with a hook 1024a associated with a receiving element 1024 of the support element 1020, such as can be seen in FIGS. 16a-b.

Figure 12A:
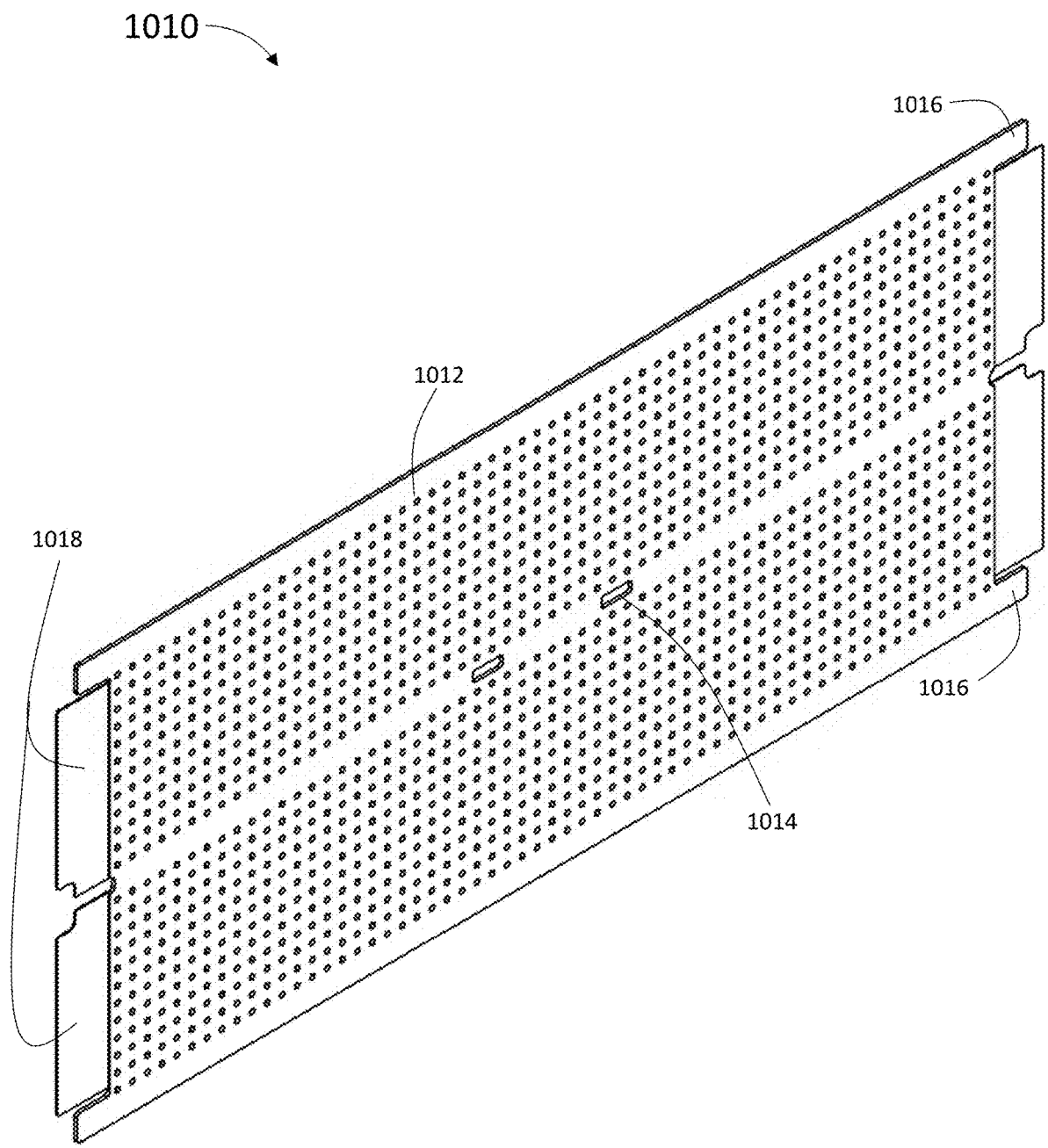
FIGS. 12a-d are perspective, front elevation, right-side plan, and top plan views, respectively, of a fluid-flow plate structure.
Figures 12B, 12C, 12D:
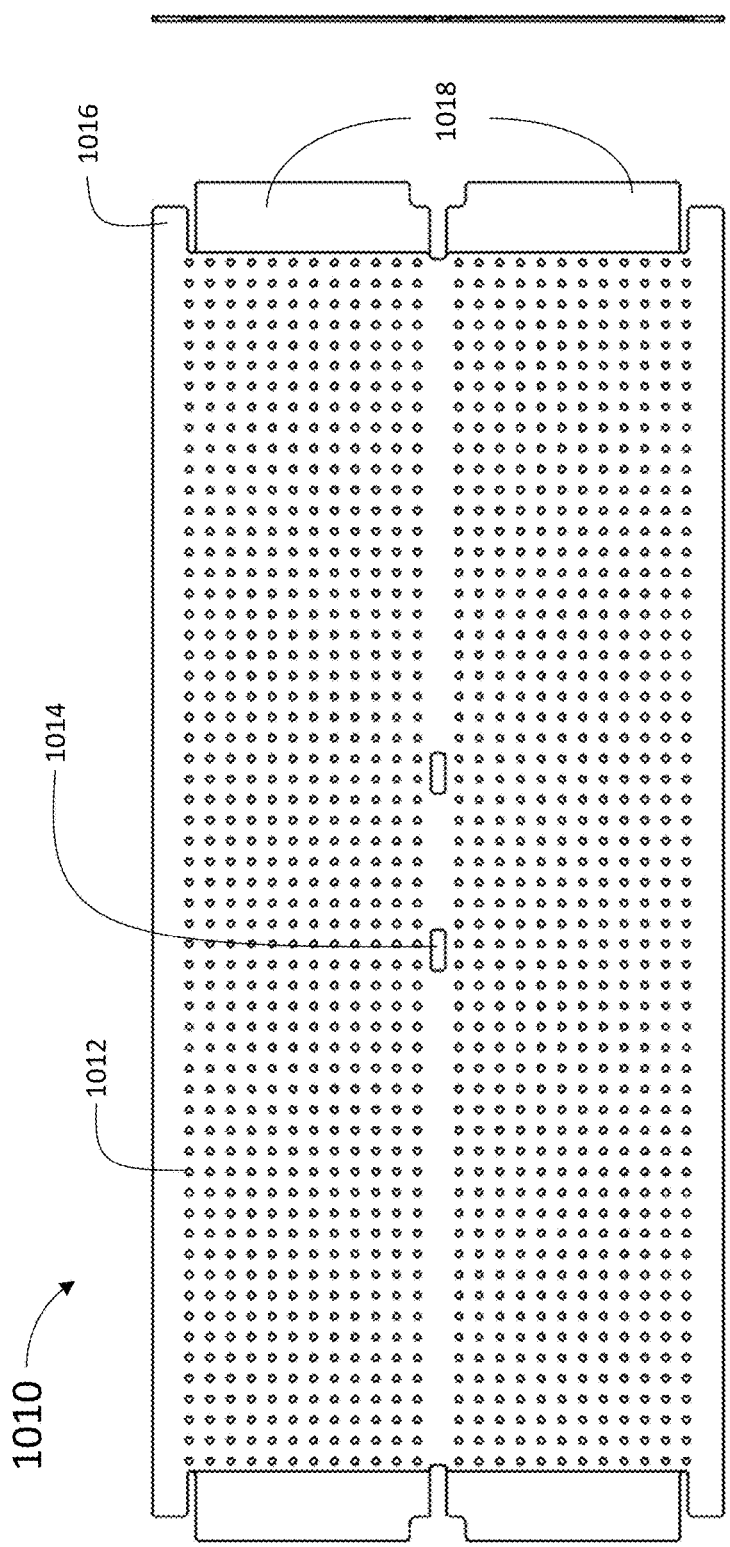

In some embodiments, one or more of such projections are gap covers 1018. In some embodiments, such gap cover 1018 covers a positioned on the widthwise edge and located between the securing tabs 1016. In some embodiments, the gap cover 1018 is configured to run across the entire length between the securing tabs 1016, while is some embodiments, such as can be seen in FIG. 12b, the securing tabs 1016 project outwards from the widthwise edge while having one or more gap which interrupts the span of the gap cover 1018. In some embodiments, the gaps are configured to accommodate interfacing the tabs 1016 with the hook 1024a of the receiving element 1024 of the support element 1020, while in some embodiments the gaps are configured to accommodate one or more optional divider 1030. It will be appreciated that while FIG. 12 depicts a central gap for a single divider 1030, the invention considers gaps positioned at varying positions and in varying numbers to accommodate dividers 1030 of varying position and number.

In some embodiments, the gap covers 1018 are of sufficient length to further extend the fluid flow path. FIG. 15 depicts an embodiment without such gap cover. In such embodiments, various environmental conditions associated with the working conditions of the wash tank potentially result in unwanted food particles, articles, or fluid from entering into the gap between the front wall of the wash tank and the flow guide element 1010, the gap being seen in the left side of the FIG. 15. The gap covers 1018 work to extend the fluid flow path beyond such gap, greatly reducing the possibility of such inadvertent accessing of the gap. In some embodiments, the gap cover 1018 is curved such as to direct the fluid flow path back towards the opposing wall of the wash tank, further encouraging a rolling action of the fluid within the chambers and within the wash tank.

Figure 13:
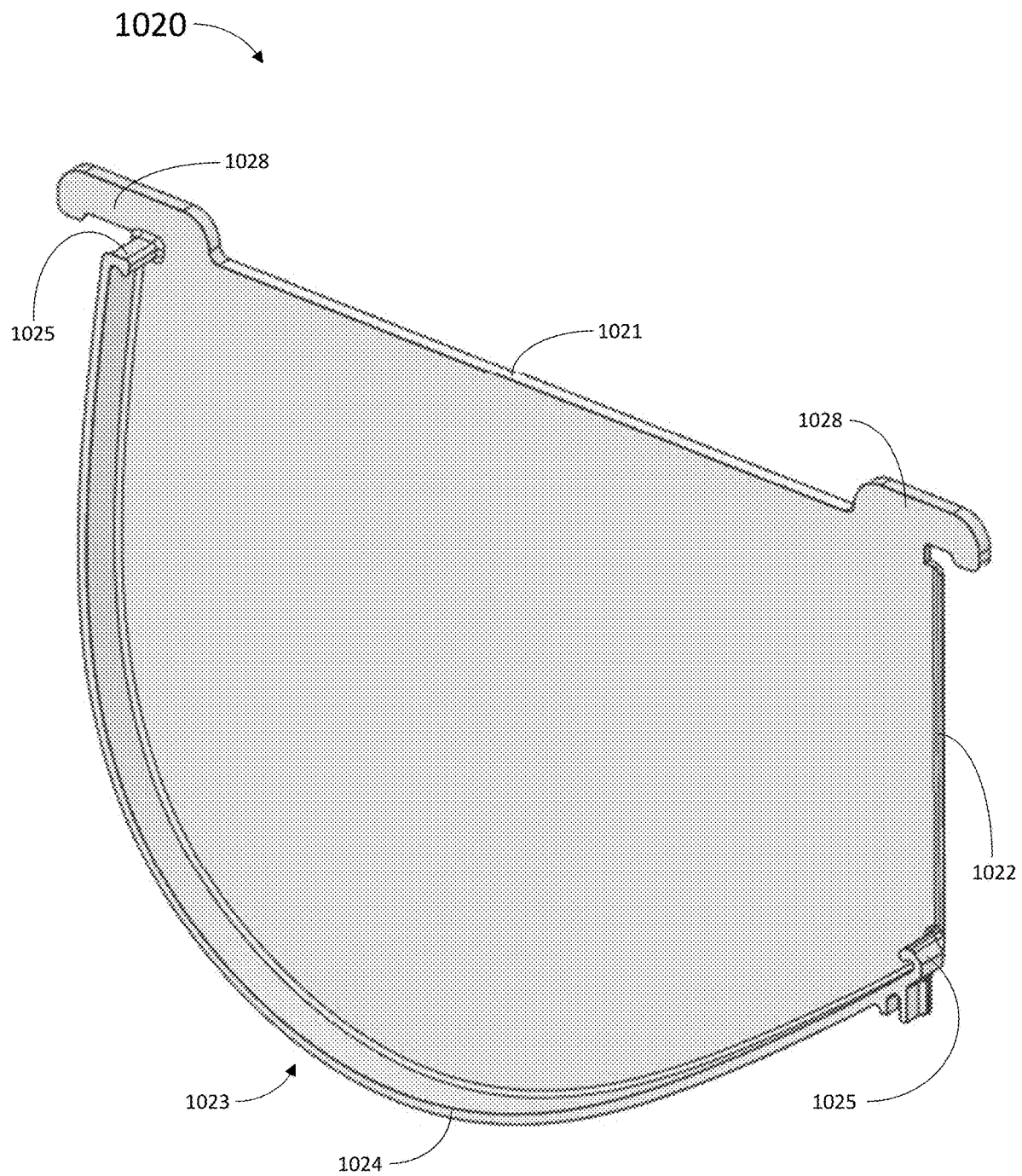
FIG. 13 is a perspective view of a support element.

Referring to FIG. 13, in some embodiments the fluid-flow plate insert structure 1000 includes one or more support element 1020. In some embodiments, the support element 1020 includes a generally flat sheet with opposing surfaces. In some embodiments, the support element 1020 includes an upper edge 1021 with front and back portions and a rear edge 1022 with top and bottom portions. In some embodiments, the top portion of the rear edge 1022 connects to the rear portion of the upper edge 1021. In some embodiments, the support element 1020 includes one or more guidance edge 1023. In some embodiments, such as seen in FIG. 13, the guidance edge 1023 includes an 'arc' or curved geometry. In some embodiments, the geometry of the guidance edge 1023 runs from the front portion of the upper edge 1021 to the bottom portion of the rear edge 1022. In some embodiments, the guidance edge 1023 geometry defines the general profile of a desired fluid flow path. In some embodiments, the guidance edge 1023 further defines a receiving element 1024, configured to receive one or more flow guide 1010.

In some embodiments, the receiving element 1024 is a shelf, also referred to herein as a ledge. In some embodiments, the receiving element 1024 projects or protrudes out or away from a face of the support element 1020. In some embodiments, the receiving element 1024 is comprised of an edge of the support itself or otherwise extends proximally an edge of the support, such as a guidance edge 1023. In some embodiments, the receiving element 1024 is a shelf which is curved to match the geometry of the guidance edge 1023. In some embodiments, the curve of the receiving element 1024 defines the profile of the flow guide 1010 and influences the resulting fluid flow path. In some embodiments, the receiving element 1024 ledge is configured to receive a lengthwise edge of the flow guide 1010. The receiving element 1024 and the lengthwise edge of the flow guide 1010 are configured to be similar in length or otherwise coincide with one another. In some embodiments, the flow guide element 1010 is received by the receiving element 1024 via a friction fit, such as through gravity or force-friction fit through a bent and captured flow guide element 1010. In some embodiments, at each end of the receiving element 1024 are one or more hook 1025. In some embodiments, the hook 1025 is a curved portion of the edge or receiving element 1024 which is configured to receiving a portion of the flow guide 1010. In some embodiments, the flow guide 1010 is bent along a curved path matching the geometry of the receiving element 1024 and one or more tab 1016 of the flow guide 1010 is interfaced with each hook 1025 of the receiving element 1024, such as seen in FIG. 16. The flow guide 1010 is then constrained in the curved and/or stressed configuration, ensuring the lengthwise edge conforms to the shape of the ledge when engaged with the receiving element 1024. When utilized with a second support element 1020 interacting with the flow guide 1010 along the opposite lengthwise edge, the support elements 1020 restrain the flow guide 1010 in a curved position.

In some embodiments, the support element 1020 includes one or more support tab 1028 along the upper edge 1021. In some embodiments, the tabs 1028 are located proximate opposing ends of the upper edge 1021. In some embodiments, the tabs 1028 are projections which extend beyond the upper edge 1021. The tabs 1028 are curved or otherwise configured to sit over the edge of the wash tank, such as shown in FIG. 15. In some embodiments, the support elements 1020 are hung from one or more rim of the wash tank via the tabs 1028, which support the weight of the support elements 1020 and any further elements attached to the support elements 1020, such as the flow guide 1010 and/or one or more divider 1030.

Figure 14:
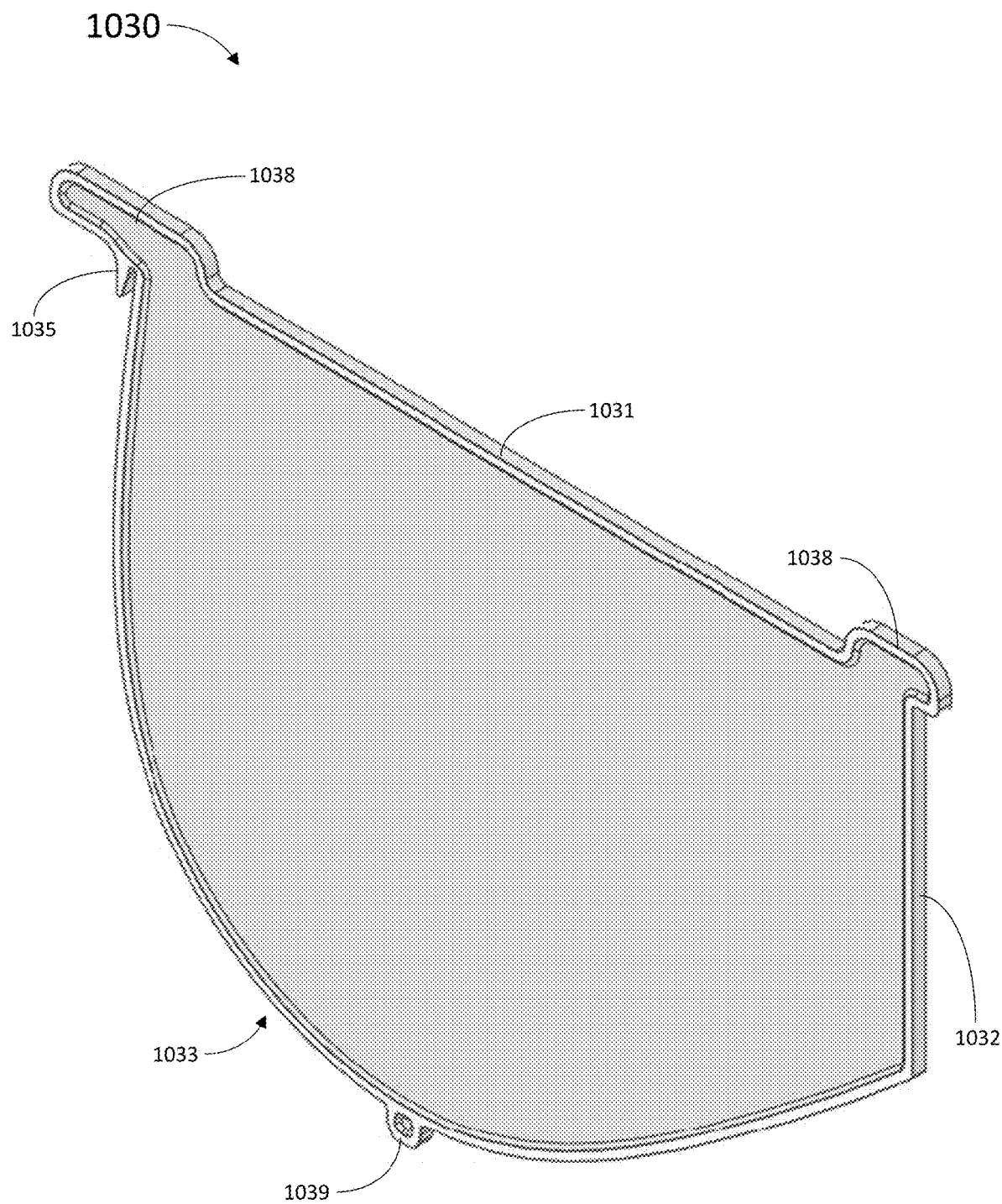
FIG. 14 is a perspective view of a divider element.
Figure 17:
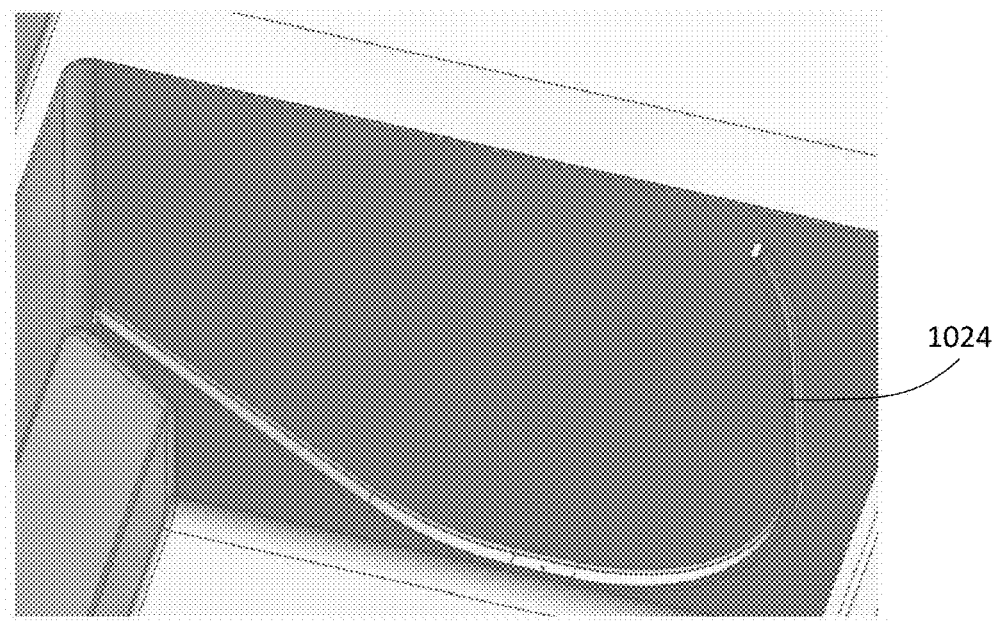
FIG. 17 is a perspective view of an integrated receiving element, according to some embodiments of the present invention.

In some embodiments, the receiving element 1024 is mounted or otherwise integrated with in the sidewall of the tank itself, such as seen in FIG. 17. In such embodiments, the receiving element 1024 maintains an arc or curved geometry and is configured to receive the flow guide 1010. In some embodiments, the flow guide 1010 is then inserted directed into the wash tank, interfacing with the receiving element 1024. In some embodiments, the weight of the flow guide 1010 is supported by the walls of the tank itself In some embodiments, such as the one shown in FIG. 11, the insert structure 1000 includes one or more divider 1030. In some embodiments, the divider 1030, such as the one depicted in FIG. 14, includes an upper edge 1031 with front and back portions and a rear edge 1032 with top and bottom portions. In some embodiments, the top portion of the rear edge 1032 connects to the rear portion of the upper edge 1031. In some embodiments, the divider 1030 includes one or more guidance edge 1033. In some embodiments, such as seen in FIG. 14, the guidance edge 1033 includes an 'arc' or curved geometry. In some embodiments, the geometry of the guidance edge 1033 runs from the front portion of the upper edge 1031 to the bottom portion of the rear edge 1032. In some embodiments, the guidance edge 1033 geometry matches the general profile of a desired fluid flow path, which in some embodiments matches the shape of one or more receiving element 1024 associated with one or more support element 1020.

In some embodiments, the divider 1030 includes one or more projection 1039 along the guidance edge. In some embodiments, the projection 1039 is configured to interface with one or more aperture and/or receiving hole 1014 of the flow guide 1010. In some embodiments, the divider 1030 includes one or more support tab 1038 along the upper edge 1031. In some embodiments, the tabs 1038 are located proximate opposing ends of the upper edge 1031. In some embodiments, the tabs 1038 are projections which extend beyond the upper edge 1031. The tabs 1038 are curved or otherwise configured to sit over the edge of the wash tank, such as shown in FIG. 15. In some embodiments, the divider 1030 is hung from one or more rim of the wash tank via the tabs 1038, which support the weight of the divider 1030. In some embodiments, the divider 1030, by way of the one or more projection 1039 and the guidance edge 1033, helps stabilized the shape and position of the flow guide 1010 within the tank. In some embodiments, the divider 1030 separates the wash tank into one or more chamber. Each chamber is associated with one or more jets of the wash tank. By way of the divider 1030 and association with separate jets, in some embodiments, the divider 1030 facilitates utilization of different washing conditions within each chamber during a single use of the wash tank, such as by varying the speed of the fluid flow from the jet of each chamber.

In some embodiments, the divider further includes a securing lip 1035. The securing lip 1035, in some embodiments, extends from an edge of the divider, while in some embodiments the securing lip 1035 extends from one or more support tab 1038. In some embodiments, the securing lip 1035 extends downwards from a lower portion and/or surface of a support tab 1038. In some embodiments, the support tab 1038 from which the securing lip 1035 extends is positioned relative to a front portion of the divider 1030. In some embodiments, the securing lip 1035 is positioned, extending from the support tab 1038, such that is it offset at first distance from the guidance edge 1033, such that a gap is formed between the securing lip 1035 and the guidance edge 1033, in some embodiments the gap being dimensioned such as to accommodate a portion of the flow guide 1010. The securing lip 1035 acts to restrain and secure the divider 1030 within the insert structure by capturing a portion of the flow guide 1010 when the divider is positioned within the insert structure, as can be seen in FIG. 15.

Figure 18:
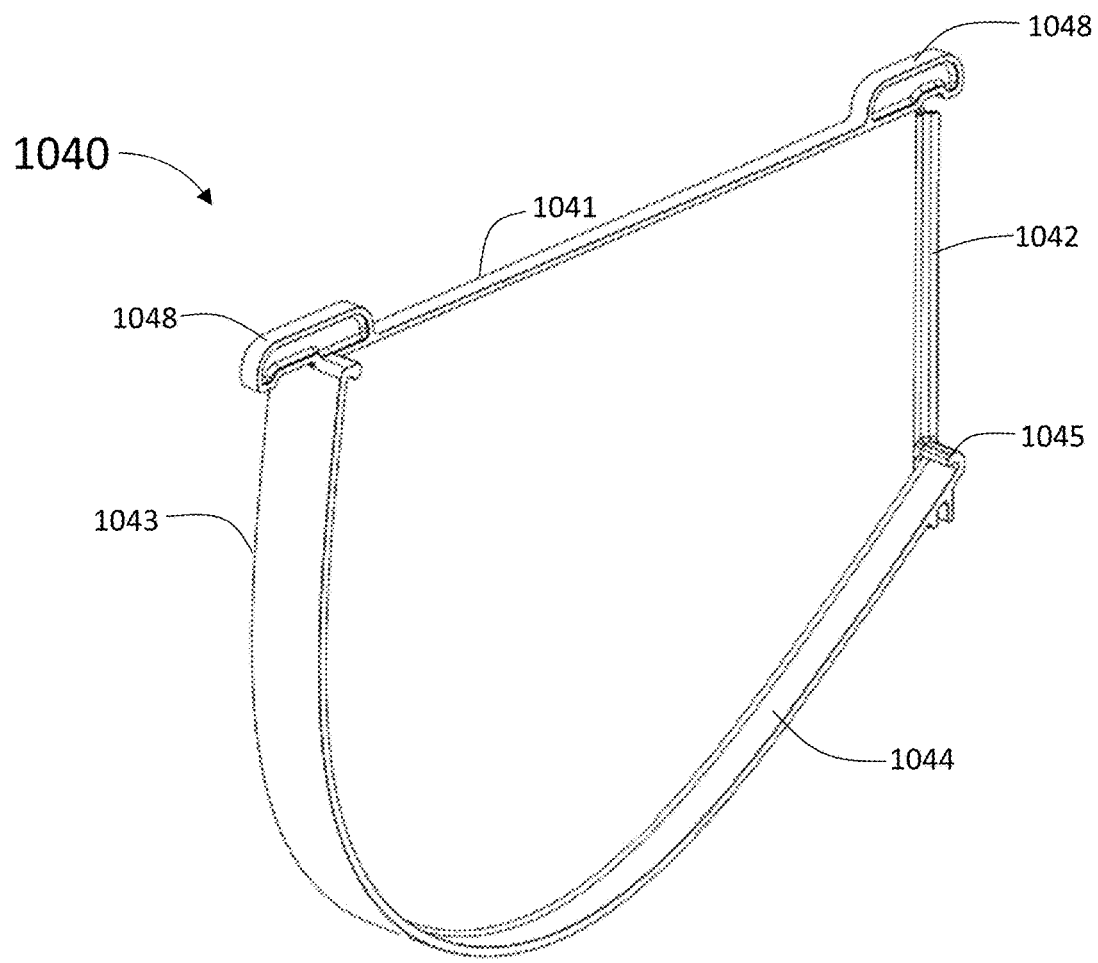
FIG. 18 is a perspective view of a double-sided support element according to some embodiments of the present invention.

Referring to FIG. 18, in some embodiments a central support 1040 is utilized. In some embodiments, a central support 1040 considers each of the features of a support element 1020 (such as an upper edge 1041, a rear edge 1042, a guidance edge 1043, a first receiving element 1044, one or more hook 1045, and one or more support tab 1048), with the addition of a second receiving element 1046 positioned opposite the first 1044. In some embodiments, the central support 1040 is configured to receive a plurality of flow guides 1010. In some embodiments, the central support 1040 works in tandem with one or more additional receiving element 1024 associated either with a sidewall of the tank or a support element 1020 of the tank to support a flow guide 1010 and define one or more fluid path. In some embodiments, the second receiving element 1046 of the central support 1040 has a similar geometry as the first receiving element 1044, whereas in yet some other embodiments the second receiving element 1046 has a geometry dissimilar from the first 1044. Where the geometries are dissimilar, the insert structure 1000 is configured to support flow guides 1010 with differing lengths and dimensions, such as that the insert structure 1000 is configured to have multiple chambers, each with its own fluid flow path and resulting flow guide geometry. In this way, a single insert structure 1000 enables multiple washing configurations and chambers which creating varying washing actions unique to the chamber, enabling optimization of washing certain articles within each chamber.

Figure 19A:
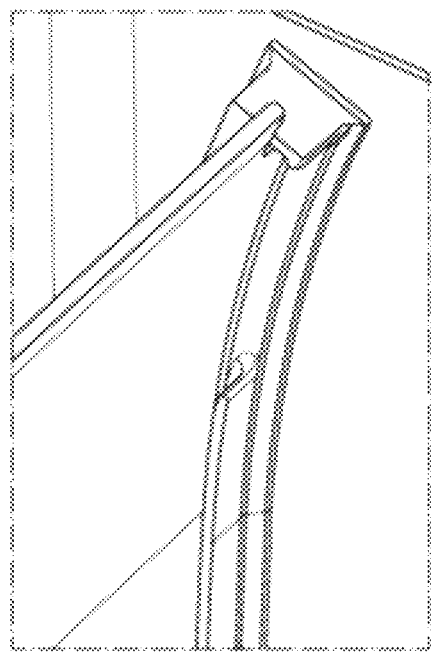
FIGS. 19a-d are perspective views of a flow guide element interfacing with a receiving element track of a support element according to some embodiments of the present invention.
Figure 19B:
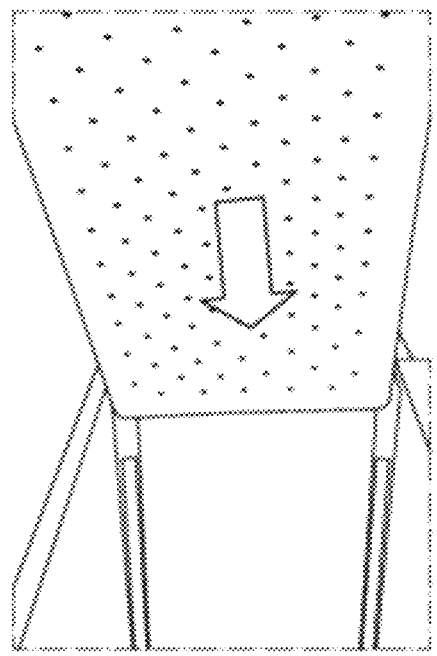
Figure 19C:
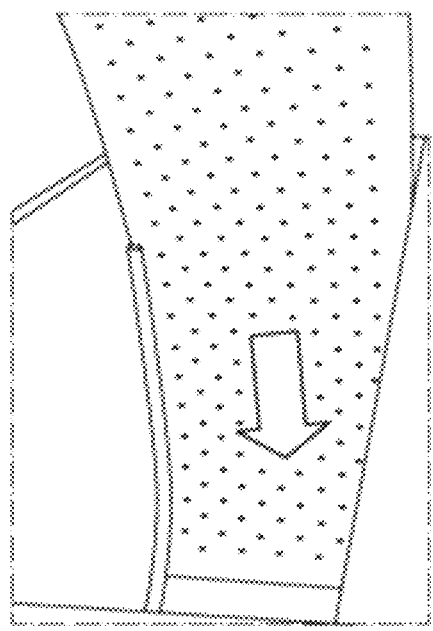
Figure 19D:
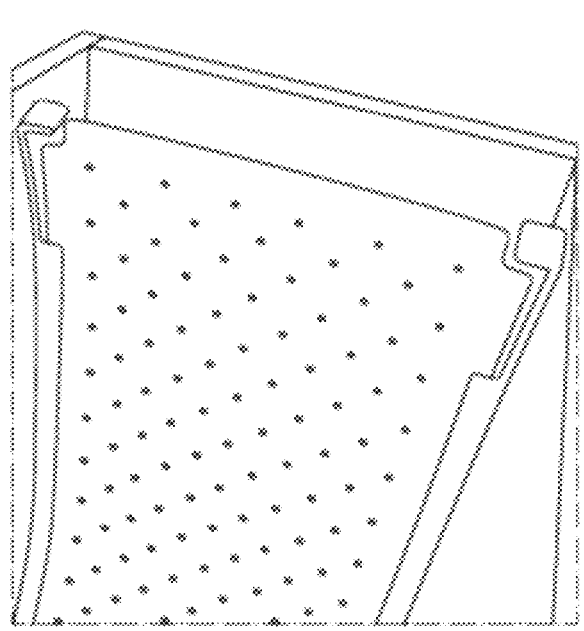

Referring to FIGS. 19a-d, in some embodiments, the receiving element 1024 includes a groove, also referred to herein as a track or a slot. In some embodiments, the receiving element track is a projection protruding out of the face of a support element or a wall of the wash tank. The projection include a groove, slot, or tack which runs the length of the receiving element. In some embodiments, the groove runs through the entire receiving element, while in other embodiments the groove runs through only a portion of the receiving element. In some embodiments, the groove runs nearly the entirety of the receiving element but stops just short of the edge at one end. In some embodiments, this provides a boundary to restrain the flow guide. In some embodiments, the groove is bounded at both ends. In such embodiments, the projection includes an access notch. The access notch, as can be seen in FIG. 19b, allows access to the track from a face of the projection. The flow guide is dimensioned such that it is inserted into the track via the access notch, as can be seen in FIGS. 19b and 19c. In some embodiments, the flow guide includes one or more tab along the widthwise edge of the flow guide, wherein the tab is configured to extend the length from the access notch to the end of the receiving element, such as shown along the top side of the receiving element in FIG. 19. In some embodiments, the tab is configured to extend beyond the length from the access notch to the end of the receiving element, reducing the possibility of unwanted access by fluid, particles, and/or articles to the gap between the receiving element and the side wall of the tank.

Figure 20A:
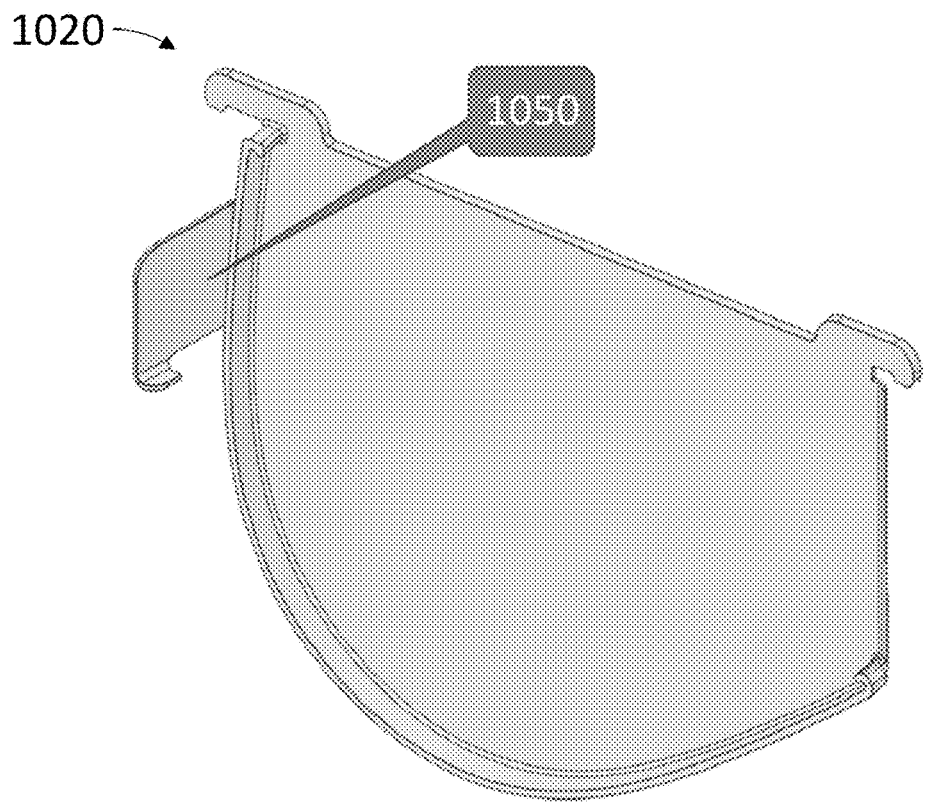
FIGS. 20a and 20b are perspective views of a support element according to some embodiments of the present invention.
Figure 20B:
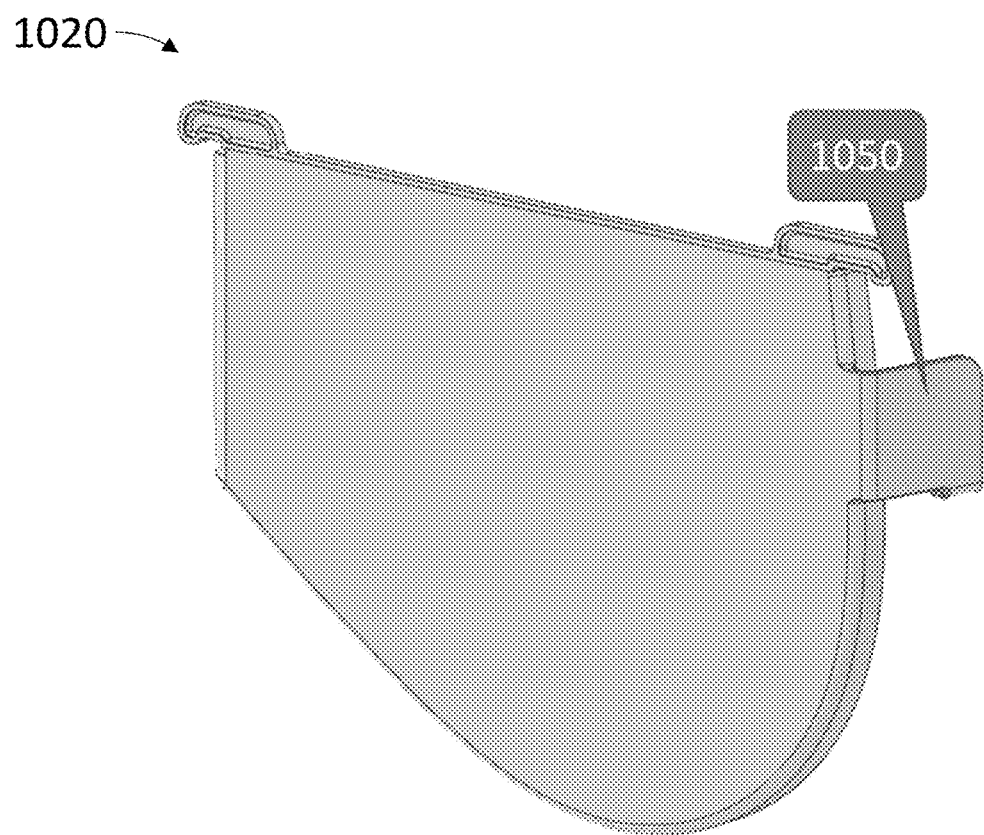

Referring to FIGS. 20a and 20b, in some embodiments, the support element 1020 includes a securing element 1050. In some embodiments, the securing element 1050 is referred to as a leverage element, a spring element, a wedging element, or a flat spring element. In some embodiments, the securing element 1050 is configured to be positioned along a portion of the support element 1020. In some embodiments, the securing element 1050 is formed from a piece of resilient material. In some embodiments, such resilient material is metal, while is some embodiments the material is plastic or thermoplastic, such as polysulfone. It will be appreciated by those in the art that other materials may be suitable, so long as those materials provided provide sufficient resisting force when deformed. In some embodiments, the material is one with elastic properties sufficient to provide resistance when deformed. In some embodiments, the support element 1050 extends away from a portion of a support 1020/central divider 1030, increasing the overall length and/or width of the support/central divider.

In some embodiments, the securing element 1050 is configured to deform elastically and provide resistance. In some embodiments, the securing element 1050 acts as a flat spring or a leaf spring. In some embodiments, the securing element 1050 is configured to provide resistance against at least one face of the wash tank while the support element 1020 and/or divider 1030 is positioned within the wash tank. In some embodiments, by way of said resistance, the securing element 1050 is configured to retain/stabilize the element within the wash tank. In some embodiments, the securing element 1050 resists vibrational loads associated with the operation of the wash tank. In some embodiments, the securing element 1050 resists loading forces associated with one or more jet during operation of the wash tank. In some embodiments, the securing element 1050 resists loading forces associated with movement of items located within the wash tank during operation of the wash tank. In some embodiments, the securing element 1050 acts as a force to securing the support element 1020 and/or divider 1030 within the wash tank, improving stability of the element and reducing spillage/cross bin contamination from movement of the element within the tank during operation.

Still referring to FIGS. 20a and 20b, in some embodiments, the securing element 1050 is positioned along a wall or an edge of a support element 1020 and/or divider 1030. In some embodiments, the edge is a front edge of the support element, while in some embodiments the edge is a rear edge of the support element. In some embodiments, the securing element 1050 extends away from the edge, forming a flap or otherwise elongated segment. In some embodiments, the securing element 1050 extends perpendicular or substantially perpendicular to the place of a face of the support element 1050. In some embodiments, where the securing element 1050 extends substantially perpendicular, the securing element 1050 protrudes such that it angles slightly away from the body of the support element. In some embodiments, the extension/protrusion of the securing element 1050 creates an angle with a face of the support element. In some embodiments, the angle is less than 90 degrees. In some embodiments, the angle is 90 degrees. In some embodiments, the angle is greater than 90 degrees. In such embodiments, where the angle is greater than 90 degrees, the protrusion extends the overall length of the support element, such that the support element is dimensioned to be slightly longer than an opening in a wash tank when including the securing element. In some embodiments, the width of the support element is greater than the width of the securing element, while in some embodiments the width of the support element is lesser than the width of the securing element.

In some embodiments, the securing element 1050 is configured to be movable between an unloaded and loaded configuration. In some embodiments, the securing element 1050 is moved from an unloaded to an unloaded configuration when an external load elastically deflects the securing element 1050. It will be appreciated that the elasticity of the securing element 1050 is dependent on the material and shape of the element. In some embodiments, the element is formed of metal, while in other embodiments it is formed form a thermoplastic, such as polysulfone. In some embodiments, where the material utilized in perfectly brittle, the securing element is configured to break under an impact loading of 58 pounds per square foot. In some embodiments, where an impact resistant material is utilized, the breaking impact force is higher than 58 pounds per square foot. In some embodiments, the stress placed on the securing element during loading is 6435 pounds per square inch. In some embodiments, the stress is lower than the aforementioned number, while in some embodiments it is larger. It will be appreciated that the securing element is configured to store and retransmit these loading forces when in the loaded configuration, such that the securing element would push back against the item or external action which is providing a loading force.

Figure 21D:
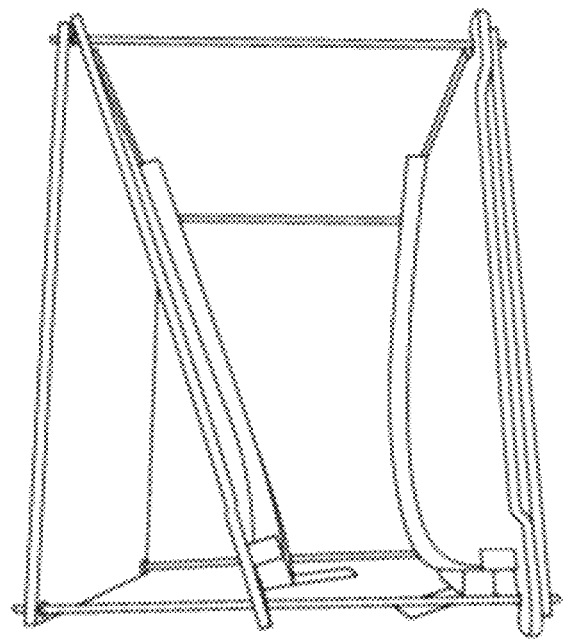

Referring to FIGS. 21a-e, steps for installing a support element 1020 with a securing element into a wash tank are provided. In some embodiments, as shown here, the securing element 1050 is positioned on a front edge and/or guidance edge of the support element 1020. In some embodiments, as the securing element 1050 increases the total length of the support element to longer than the length of the wash tank opening, the securing element 1050 is placed into the tank initially at an angle, as seen in FIG. 21b. While in this angled configuration, the opposing tabs 1028 at the top of the support element 1020 interface with the tops of opposing sidewalls, thereby supporting the support element 1020 against the forces of gravity. Meanwhile, as can be seen in FIG. 21b, the securing element 1050 is in an unloaded configuration when the support element 1020 is in the angled configuration. In some embodiments, the support element 1020 is then repositioned, by sliding or otherwise, to be flush against a sidewall of the wash tank, such as is shown in FIG. 21c. In some embodiments, such a move applies a sliding, leverage, or swing force to the support element to place the securing element into a loading condition while this move is performed. In some embodiments, the swing force required for this move is greater than 4 pounds of force being applied to the securing element. In some embodiments, the swing force is 4.2 pounds. In some embodiments, the swing force is greater than 9 pounds, particularly where the wash tank is relatively narrow. In some embodiments, the swing force is 9.3 lbs.

Figure 21E:
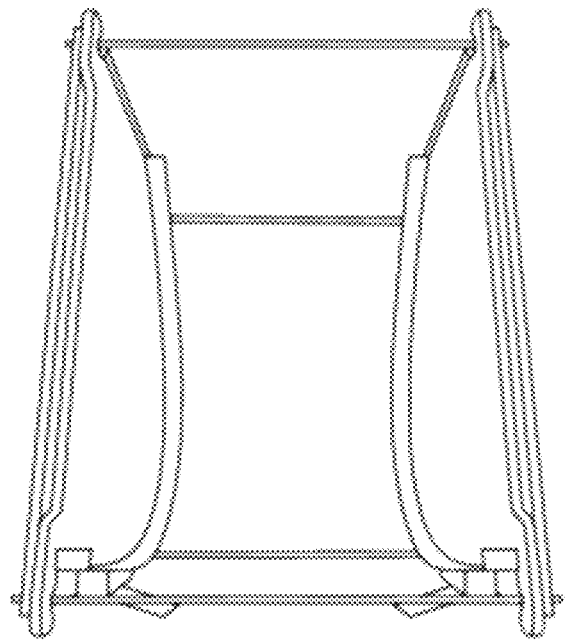
Figures 22A, 22B, 22C:
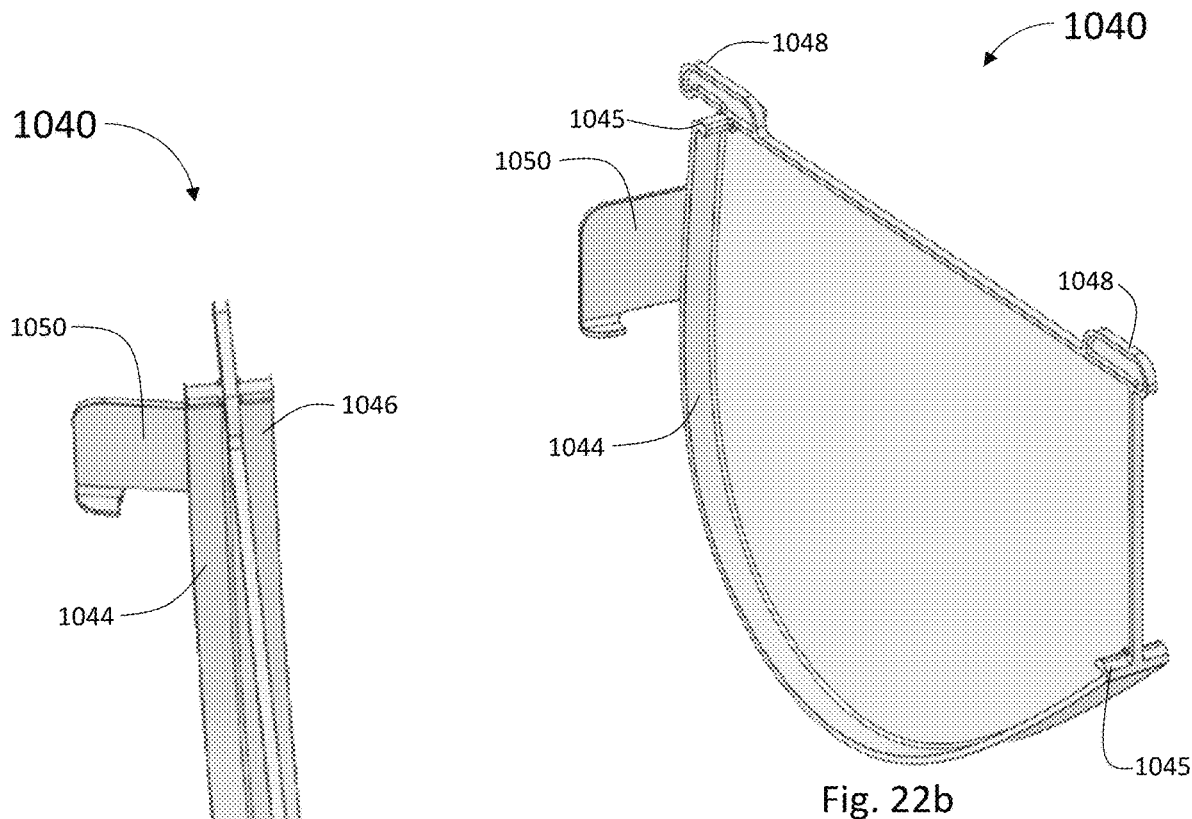
FIGS. 22a-d depict a double-sided support element according to some embodiments of the present invention.
Figure 22D:
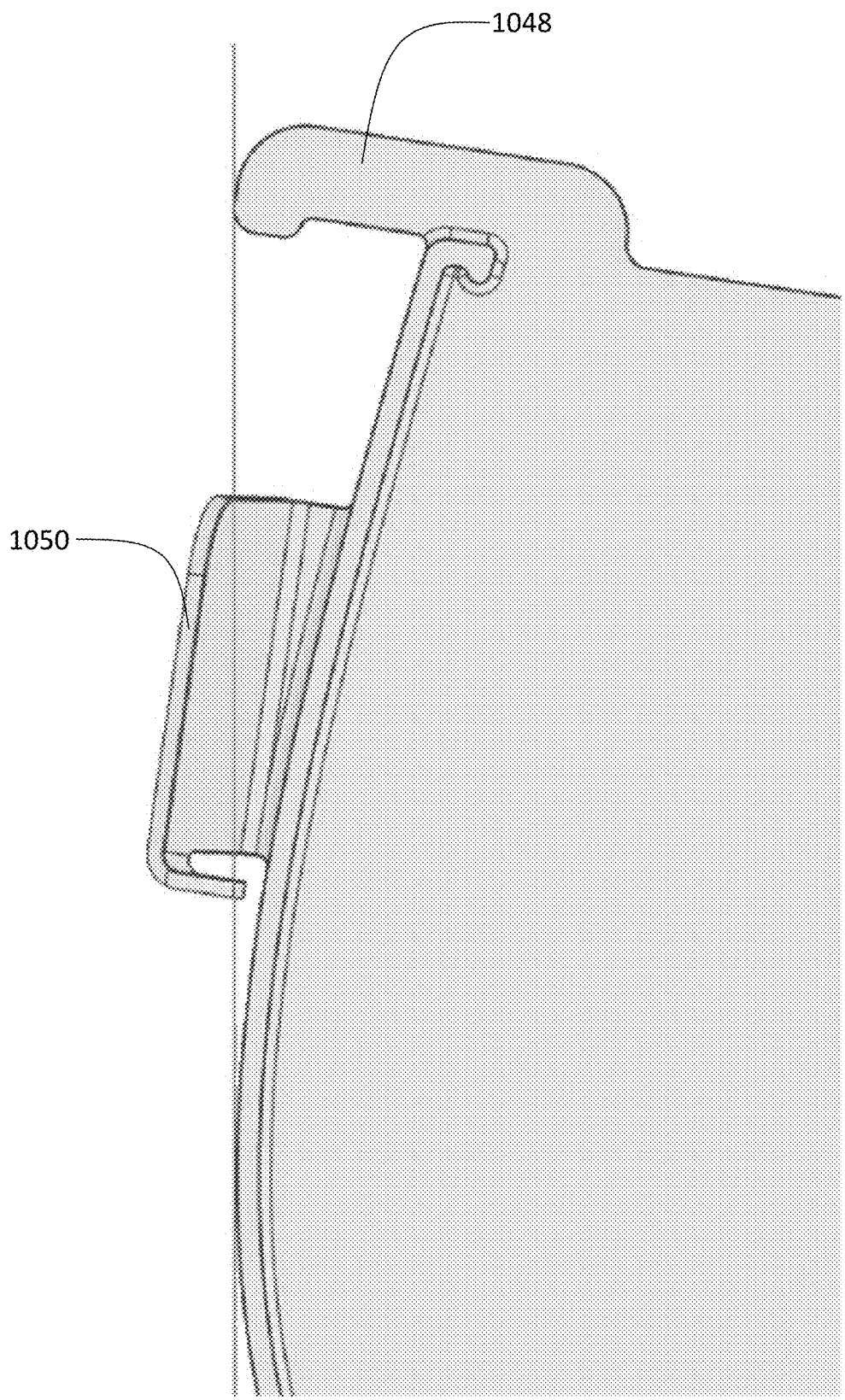

FIG. 21c depicts the wash tank without a front facing side wall, and therefore does not depict the securing element being placed into a loading configuration by this move, however, one ordinarily skilled in the art would appreciate that such a move would result in the securing element being leveraged against the front side wall of the tank. In some embodiments, such a leveraging causes displacement of the securing element, resulting the in the securing element providing resisting force against the sidewall of the tank. In some embodiments, this resisting force stabilizes and secures the support element within the tank. In some embodiments, as shown in FIGS. 21d and 21e, a second support element is placed substantially opposing the first support element and leveraged into the place in the same manner.

Referring to FIGS. 22a-d, in some embodiments, a double-sided support element includes a securing element 1050. In some embodiments, the securing element 1050 is positioned along a wall or an edge of a double-sided support element. In some embodiments, the edge is a front edge of the double-sided support element, while in some embodiments the edge is a rear edge of the double-sided support element, while in some embodiments the edge is a guidance edge. In some embodiments, the securing element 1050 extends away from the edge, forming a flap or otherwise elongated segment. In some embodiments, the securing element extends perpendicular or substantially perpendicular to the place of a face of the double-sided support element. In some embodiments, where the securing element extends substantially perpendicular, the securing element protrudes such that it angles slightly away from the body of the double-sided support element. In some embodiments, the extension/protrusion of the securing element creates an angle with a face of the double-sided support element. In some embodiments, the angle is less than 90 degrees. In some embodiments, the angle is 90 degrees. In some embodiments, the angle is greater than 90 degrees. In such embodiments, where the angle is greater than 90 degrees, the protrusion extends the overall length of the double-sided support element, such that the double-sided support element is dimensioned to be slightly longer than an opening in a wash tank when including the securing element.

Figure 23A:
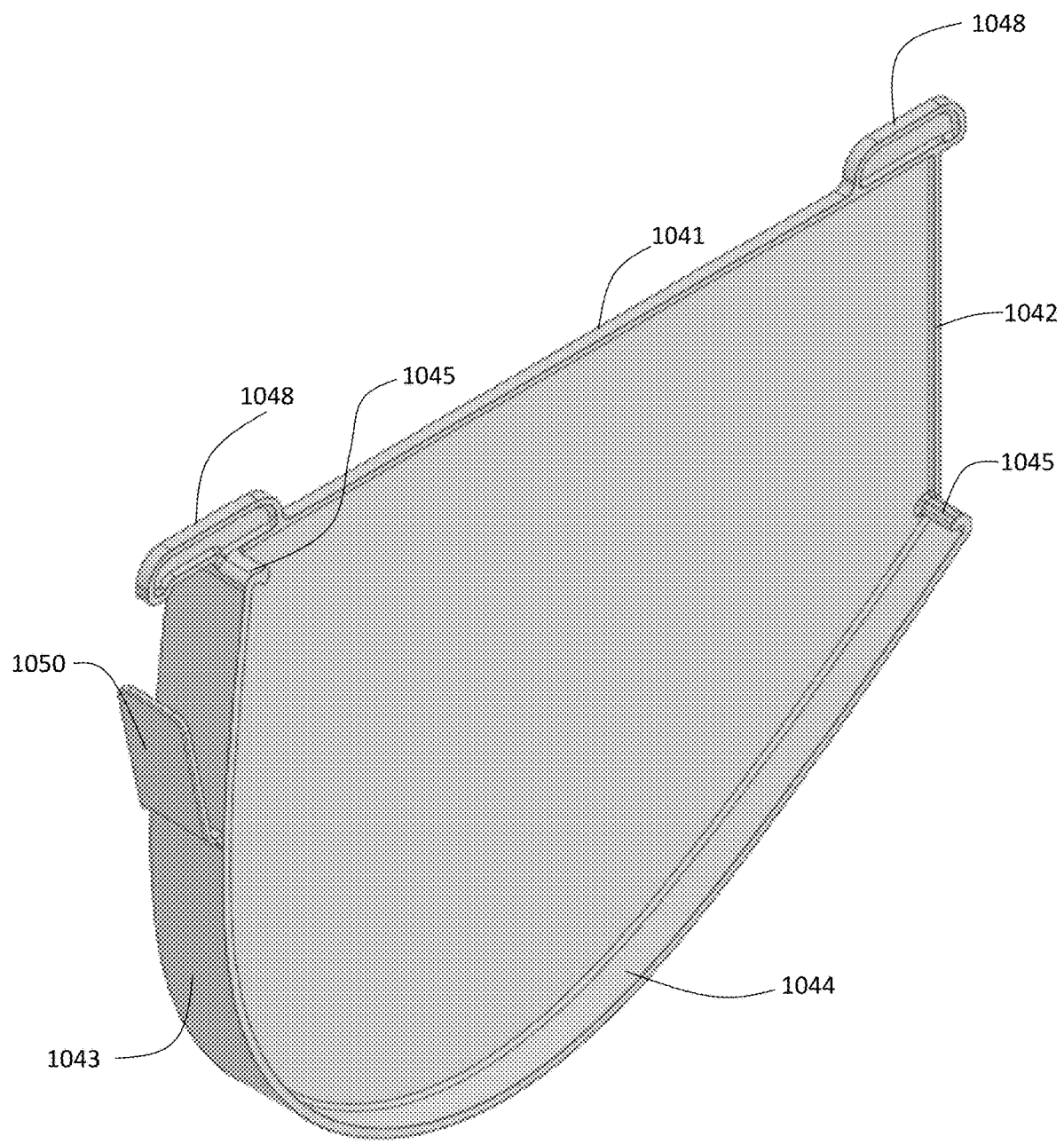
FIGS. 23a and 23b depict a double-sided support element according to some embodiments of the present invention.
Figure 23B:
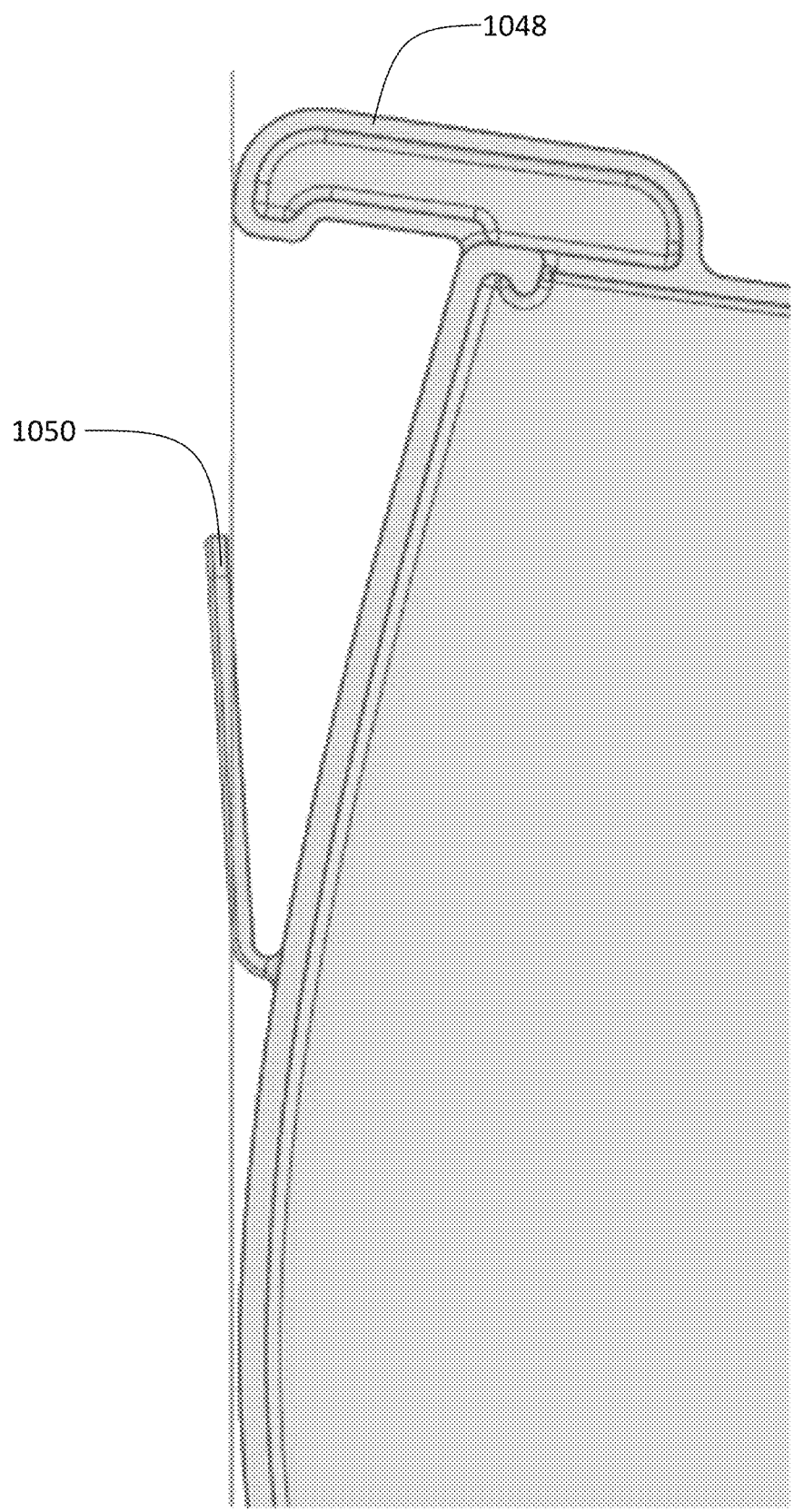

Referring to FIGS. 23a and 23b, in some embodiments, the securing element 1050 is a clip-style element. While FIGS. 23a and 23b depict a double-sided support element, it is appreciated that a clip-style element is employable on a single sided support element. In some embodiments, the securing element is positioned on an edge of the support element. In some embodiments, the securing element extends a first distance directly away from the attached edge. In some embodiments, the securing element extends a second distance in a direction in-line or on-place with a plane of the face of the side wall. In some embodiments, the securing element extends in such a manner such that it angles slightly away from the body of the support element. In some embodiments, the extension/protrusion of the securing element creates an angle with a face of the support element. In some embodiments, the angle is less than 90 degrees. In some embodiments, the protrusion extends the overall length of the support element, such that the support element is dimensioned to be slightly longer than an opening in a wash tank when including the securing element.

In some embodiments, alternative styles of securing elements are considered. In some embodiments, the securing element is generally paddle-like in structure. In some embodiments, a first end of the paddle structure is a free end, while a second end is attached to an edge of the support element. In some embodiments, the securing element is resilient, such that placing a load on the free end results in elastic displacement of the securing element.

In some embodiments, the securing element is contiguous with the support element and/or divider, such that both the support element and the resulting securing element are formed from the same piece of material. In some embodiments, such forming is through cold rolling, stamping, molding, or other like process. In some embodiments, the securing element is formed separate from the support element and later attached to the support element. In some embodiments, the securing element is formed by stamping and subsequently bending to the desired angled a piece of metal. In some embodiments, the securing element is formed by molding plastic or forming plexiglass. In some embodiments, the securing element is then attached to the support element. In some embodiments, the attachment is made by welding, adhesive, bolting, or the like.

Figure 24:
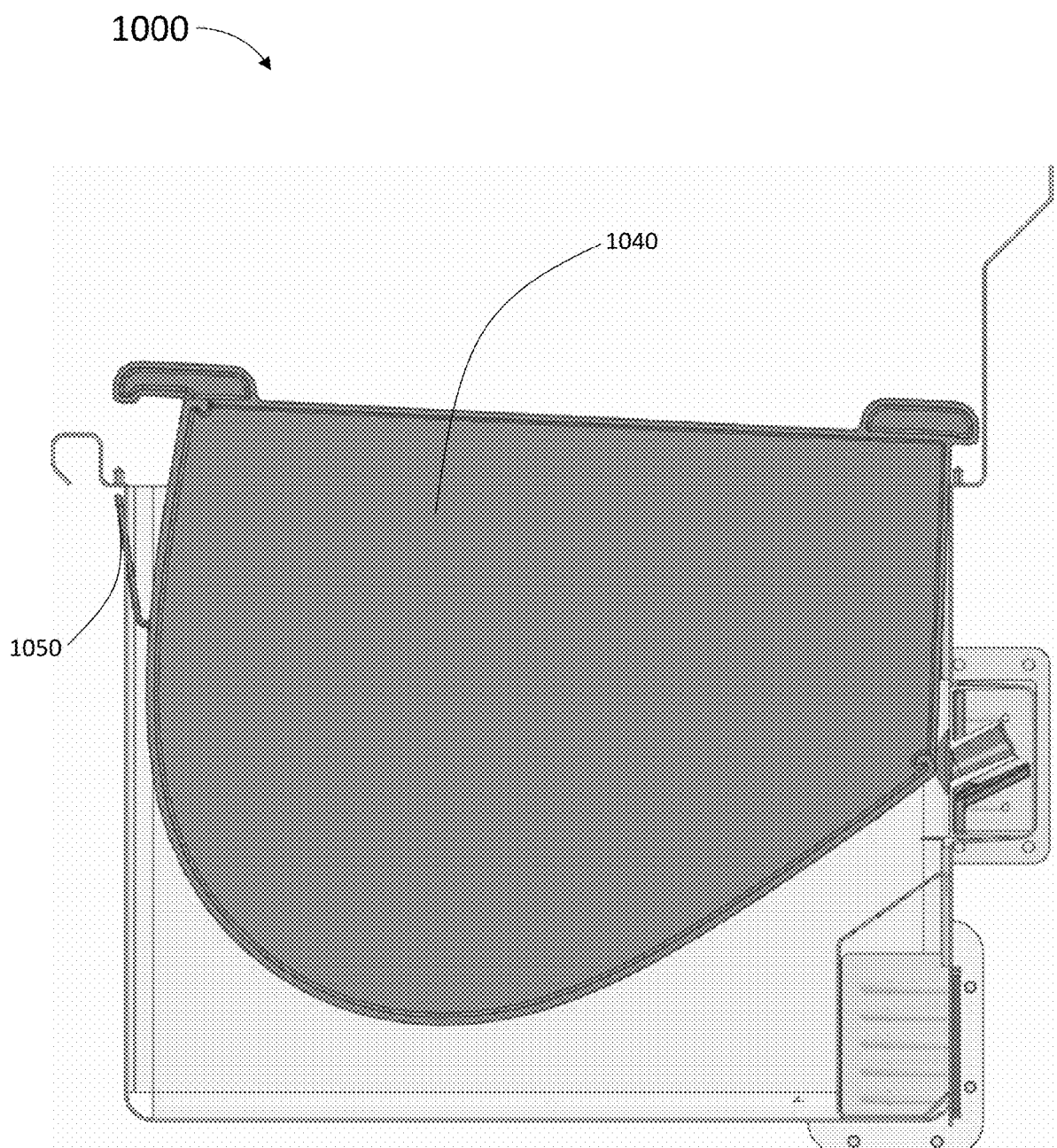
FIG. 24 is a section view of a double-sided support element positioned within a wash tank according to some embodiments of the present invention.
Figure 25:
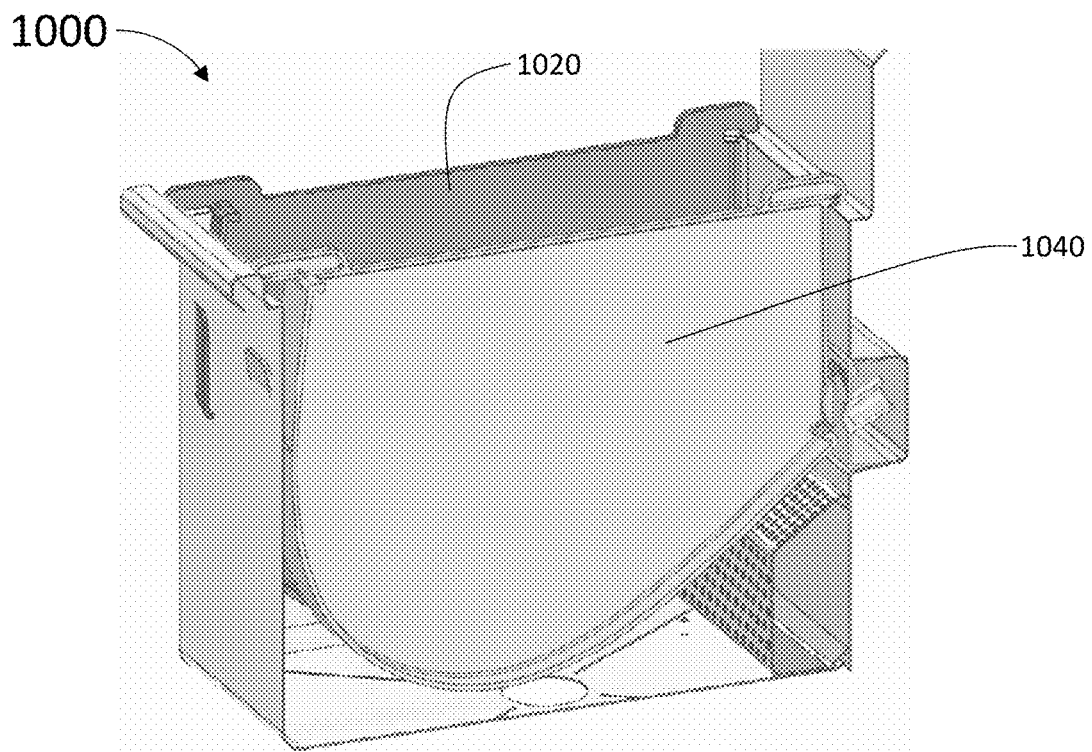
FIG. 25 is a perspective section view of support element and a double-sided support element positioned within a wash tank according to some embodiments of the present invention.

Referring to FIG. 24, In some embodiments, a double-sided support element is configured to be placed in a wash tank and retained by the securing element. In some embodiments, where the securing element is a clip-style securing element, the double-sided support element is placed in the wash tank by first engaging a first tab with a first wall of a wash tank by lowering said tab to the top edge of the wall of the wash tank. In some embodiments, the first tab opposes a second tab, said second tab being associated with an edge of the double-sided support element proximate to the securing element. In some embodiments, the securing element rests against an upper portion of a sidewall of the wash tank, which prevents the double-sided support element from being fully inserted into the wash tank. In some embodiments, inserting the support element into the wash tank further includes applying leverage force or a swing force to the double-sided support element, said force being applied downwards. In some embodiments, the force causes the securing element to deflect such that at least one side of the support element falls or otherwise slides downwards until a second tab engages with a second wall of the wash tank. In some embodiments, a double-sided support element forms at least part of a central divider when placed within a wash tank. In some embodiments, a single-sided support element is inserted in substantially the same way, as can be seen in FIG. 25.

Figure 26:
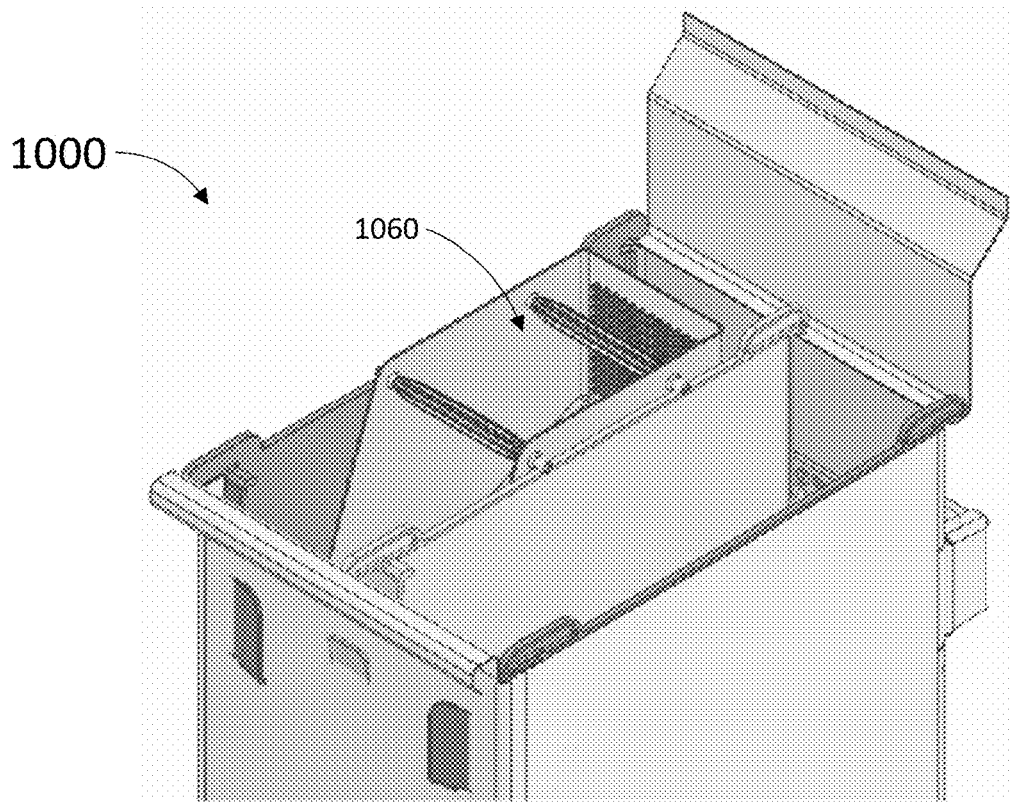
FIG. 26 is a perspective view of support element and a double-sided support element positioned within a wash tank according to some embodiments of the present invention.
Figure 27:
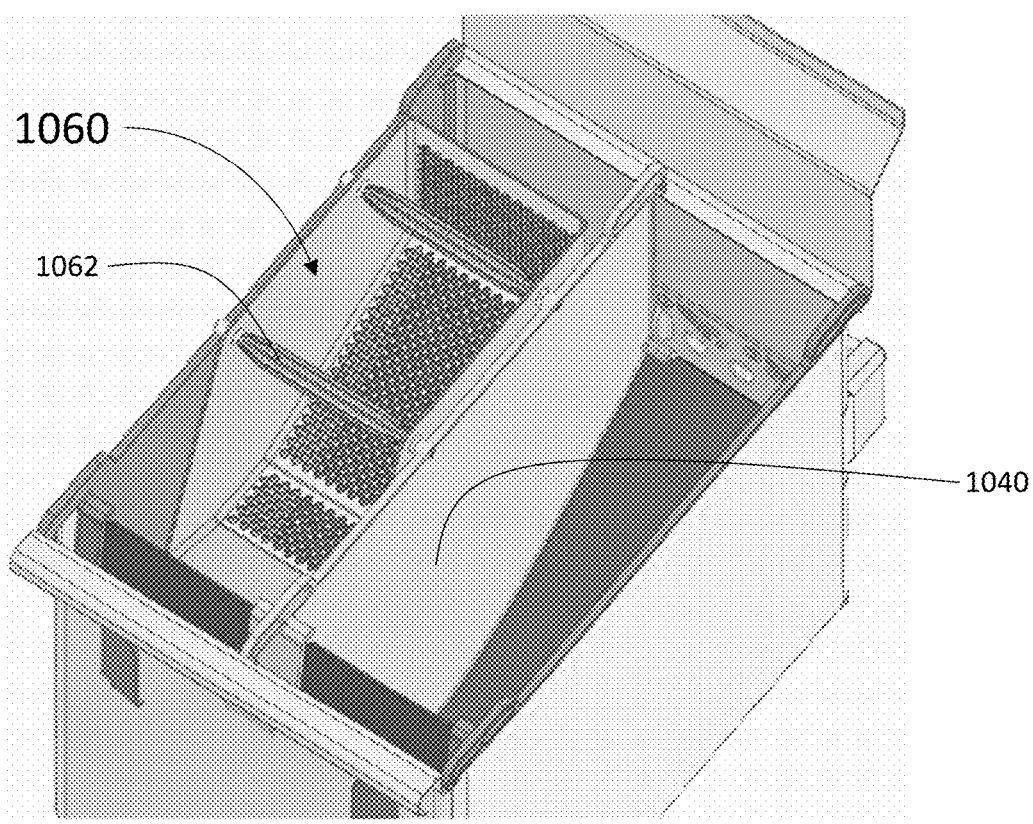
FIG. 27 is a perspective view of support element and a double-sided support element positioned within a wash tank according to some embodiments of the present invention.

Referring to FIGS. 26 and 27, in some embodiments, one or more support elements are inserted into a wash tank in a multi-bay configuration. FIGS. 26 and 27 depict a dual-bay configuration, but it will be appreciated that additional multi-bay configurations are considered, such as configurations with 3, 4, 5, or more bays. In some embodiments, a dual-bay configuration is achieved utilizing two opposing single-sided support elements with a single dual-sided support element therebetween, each element placed into the wash tank and support by one or more tabs interacting with the sidewall. In some embodiments, a flow guide element is associated with each bay. In some embodiments, one flow guide element spans both bays, while in some embodiments each bay includes its own, individual flow guide. In embodiments where each bay includes its own flow guide, each flow guide is supported by a support element positioned on either side. Each support element includes a flow guide guidance element. In some embodiments, the guidance element is configured to retain the flow guide in a first shape, the first shape being a desired fluid flow path through the bay. In some embodiments, the guidance element is configured to retain the flow guide in a second shape, the second shape being a second desired fluid flow path through the bay. In some embodiments, each bay has a guidance element which is configured to retain the flow guide in a shape similar to that of the other bays, while in some embodiments the fluid flow path created by the guidance is unique to each bay. In some embodiments, the fluid flow path correlates to a position of one or more jets associated with the wash tank, such that the jets propel fluid which is then pathed along the fluid flow path within the bay.

Figure 28:
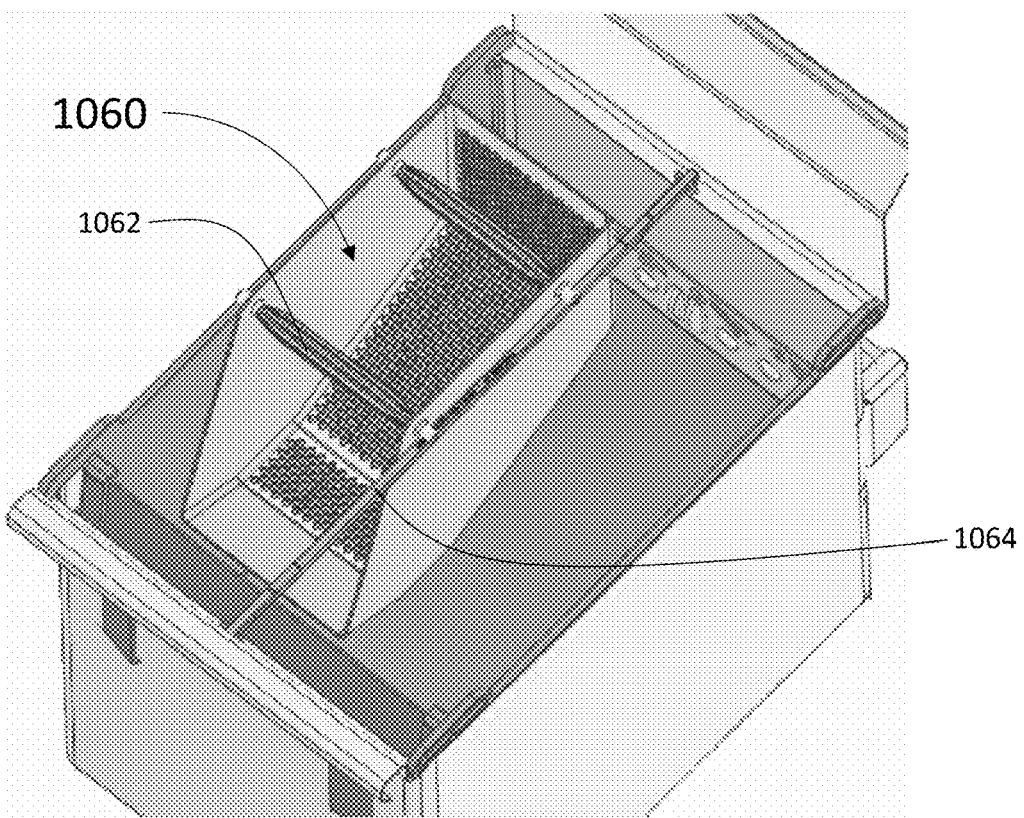
FIG. 28 is a perspective view of support element positioned within a wash tank according to some embodiments of the present invention.

Referring to FIG. 28, In some embodiments, one or more support elements are inserted into a wash tank in a single-bay configuration. In some embodiments, opposing support elements each abut opposing walls of a wash tank, thereby creating a single cavity therebetween, or a single bay. In some embodiments, each support element includes a surface proximate a wall of the wash tank and a surface which faces away from the wall of the wash tank, thereby creating opposing but facing surfaces of the support element. In some embodiments, the support elements include opposing but facing guidance elements configured to interact with and otherwise retain a flow guide in a desired shape, such as that of a desired fluid flow path through the bay.

Referring to FIGS. 27 and 28, in some embodiments, a basket attachment 1060 is included. In some embodiments, the basket 1060 is a powered utensil basket. The basket 1060 is configured to interface with or otherwise be supported by one or more support elements 1020. In some embodiments, the basket 1060 is a utensil basket, with in other embodiments the basket 1060 is specifically designed to hold or otherwise secure specific items within a bay of the wash tank, such as frozen food items, specific washable equipment, or specific washable dishware, or the like. In some embodiments, the basket 1060 includes one or more supporting stub 1062. The supporting stub 1062 is configured to interface with a top portion of a support structure, such that the support structure bears the weight of the basket 1060 and subsequently transfers the weight to a sidewall of the wash tank through one or more support tabs. In some embodiments, the basket is configured to capture at least a part of a flow of fluid within the bay and facilitate washing or other fluid action within the basket 1060 to facilitate washing or fluid interaction with one or more item within the basket 1060. In some embodiments, the basket 1060 is dimensioned to be the same width as the bay, while in some embodiments the basket is dimensioned to be a smaller width than the bay. Where the basket is dimensioned to be of a smaller width than the bay, a spanner support 1064 is utilized to support the basket. In some embodiments, the spanner support 1064 is an elongated piece which rests on opposing sidewalls of the wash tank, such as opposing front and rear side walls. The spanner support 1064 is configured to rest on opposing sidewalls at adjustable locations, thus accommodating baskets of varying sizes. In some embodiments, the spanner support 1064 is configured to support the weight of the basket and subsequently transfer the weight of the basket to the sidewalls of the wash tank.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:

1. A fluid flow structure for a washing machine wash tank the fluid flow structure comprising:
   a first support element configured to interface with a wall of the wash tank;
   a second support element configured to interface with said wall of the wash tank, positioned a first distance along said wall of the wash tank from said first support element; and
   a flow guide positioned between said first and second support elements spanning said first distance,
   wherein each of the first and second support elements include a receiving element positioned along a respective guidance edge of the first and second support elements, said receiving element configured to receive and support said flow quide.

2. The fluid flow structure of claim 1, wherein said receiving elements are projections which define a shelf, the flow guide configured to rest upon said shelf when positioned between said first and second support elements.

3. The fluid flow structure of claim 2, wherein each said receiving element is curved, thereby defining a fluid flow path.

4. The fluid flow structure of claim 3, wherein each said receiving element includes a hook at each end of said receiving element, each of said hooks configured to restrain an edge of said flow guide, thereby stressing the flow guide such that it conforms to the curve of the fluid flow path.

5. The fluid flow structure of claim 1, wherein said first support element comprises:
   an upper edge with a front portion and a back portion, and a rear edge with a top portion and a bottom portion,
      wherein the top portion of the rear edge is connected to the back portion of the upper edge; and
   wherein the guidance edge has a curved geometry running from the front portion of the upper edge to the bottom portion of the rear edge, the geometry of the guidance edge defining the general profile of a desired fluid flow path.

6. The fluid flow structure of claim 5, wherein said receiving element includes a ledge configured to receive an edge of said flow guide.

7. The fluid flow structure of claim 6, wherein said receiving element includes a hook at each end of said receiving element, each of said hooks configured to restrain an edge of said flow guide, thereby stressing the flow guide such that it conforms to the curve of the fluid flow path.

8. The fluid flow structure of claim 1, wherein said flow guide comprises:
   a surface with a plurality of holes; and
   a lengthwise edge, said lengthwise edge having two or more projections,
      wherein one or more of said projections is a securing tab configured to interface with a hook of said receiving element of each of said support elements,
   and wherein one or more of said projections are gap covers.

9. The fluid flow structure of claim 8, wherein said flow guide is configured to resiliently deform along said lengthwise edge to match the profile of such receiving elements.

10. The fluid flow structure of claim 1, wherein said flow guide has two opposing widthwise edges, said widthwise edge dimensioned such as to coincide with the first distance when said first and second support elements interface with the wash tank.

11. A streamlined fluid-flow plate insert structure comprising:
   a flow guide;
   one or more support elements; and
   one or more removable dividers,
      wherein the one or more support elements each define one or more tabs configured to interface with one or more rim of a wash tank; and
      wherein the fluid-flow plate insert structure is configured to be selectively placed within the wash tank, the one or more tabs bearing the weight of the structure and the one or more support elements providing guidance to shape the flow guide.

12. The streamlined fluid-flow plate insert structure of claim 11, wherein a surface of the flow guide includes a plurality of holes wherein at least one of the holes is a receiving hole for the one or more optional removable dividers.

13. The streamlined fluid-flow plate insert structure of claim 12, wherein the receiving hole is sized to receive a projection of the one or more removable dividers, thereby securing the one or more removable dividers relative to the one or more support elements.

14. The streamlined fluid-flow plate insert structure of claim 13, wherein a plurality of the holes are pass-through holes, the pass-through holes sized such that fluids pass through the holes while one or more articles are unable to pass through the holes.

15. The streamlined fluid-flow plate insert structure of claim 14, wherein the holes provide support for one or more articles being washed while allowing fluid and waste particles to be removed from the chamber in which the articles reside.

16. The streamlined fluid-flow plate insert structure of claim 11, wherein the flow guide element is configured to resiliently deform along a lengthwise edge to match the profile of one or more receiving elements of said one or more support elements.

17. The streamlined fluid-flow plate insert structure of claim 16, wherein the flow guide element has two opposing widthwise edges, wherein the widthwise edges are dimensioned such as to coincide with a space between the one or more receiving elements of the one or more support element when the one or more tabs interface with the one or more rims of the wash tank.

18. The streamlined fluid-flow plate insert structure of claim 17, wherein each widthwise edge includes at least two projections, each of said projections being a securing tab.

19. The fluid flow structure of claim 1, wherein each of the first and second support elements interface with the wall of the wash tank via one or more tabs defined by each of the first and second support elements which interface with a rim of the wall of the wash tank.

20. The fluid flow structure of claim 19, wherein the one or more tabs are configured to bear the weight of the fluid flow structure.

21. A fluid flow structure for a washing machine wash tank the fluid flow structure comprising:
 a first support element configured to interface with a wall of the wash tank;
 a second support element configured to interface with said wall of the wash tank, positioned a first distance from said first support element; and
 a flow guide positioned between said first and second support elements,
 wherein each of the first and second support elements include a receiving element positioned along a respective guidance edge of the first and second support elements, said receiving element configured to receive and support said flow guide; and
 wherein said receiving elements are projections which define a shelf, the flow guide configured to rest upon said shelf when positioned between said first and second support elements.

22. A fluid flow structure for a washing machine wash tank the fluid flow structure comprising:
 a first support element configured to interface with a wall of the wash tank;
 a second support element configured to interface with a wall of the wash tank, positioned a first distance from said first support element; and
 a flow guide positioned between said first and second support elements,
 wherein said first support element comprises:
 an upper edge with a front portion and a back portion;
 a rear edge with a top portion and a bottom portion;
 wherein the top portion of the rear edge is connected to the front portion of the upper edge; and
 a guidance edge, the guidance edge having a curved geometry running from the front portion of the upper edge to the bottom portion of the rear edge, the geometry of the guidance edge defining the general profile of a desired fluid flow path.

\* \* \* \* \*

UNITED STATES PATENT AND TRADEMARK OFFICE
CERTIFICATE OF CORRECTION

PATENT NO. : 12,490,879 B2
APPLICATION NO. : 17/891915
DATED : December 9, 2025
INVENTOR(S) : Licata et al.

It is certified that error appears in the above-identified patent and that said Letters Patent is hereby corrected as shown below:

In the Specification

In Column 4, Line 56, delete "support" and insert -- supported --, therefor.

In Column 5, Line 38, delete "flow a" and insert -- flow of --, therefor.

In Column 13, Line 50, delete "angled" and insert -- angled to --, therefor.

In Column 18, Line 57, delete "while is" and insert -- while in --, therefor.

In Column 20, Line 21, delete "with in" and insert -- within --, therefor.

In Column 20, Line 26, delete "directed" and insert -- directly --, therefor.

In Column 20, Line 28, delete "itself" and insert -- itself. --, therefor.

In Column 21, Line 16, delete "that is it" and insert -- that it is --, therefor.

In Column 22, Line 24, delete "while is" and insert -- while in --, therefor.

In Column 22, Line 27, delete "materials provided" and insert -- materials --, therefor.

In Column 23, Line 27, delete "form" and insert -- from --, therefor.

In Column 23, Line 28, delete "utilized in" and insert -- utilized is --, therefor.

In Column 24, Line 10, delete "the in the" and insert -- in the --, therefor.

Signed and Sealed this
Twentieth Day of January, 2026

John A. Squires
*Director of the United States Patent and Trademark Office*

CERTIFICATE OF CORRECTION (continued)
U.S. Pat. No. 12,490,879 B2

In Column 25, Line 21, delete "FIG. 24, In" and insert -- FIG. 24, in --, therefor.

In Column 26, Line 11, delete "FIG. 28, In" and insert -- FIG. 28, in --, therefor.

In Column 26, Line 30, delete "with in" and insert -- within --, therefor.

In Column 27, Line 14, delete "with in" and insert -- within --, therefor.

In the Claims

In Column 27, Claim 1, Line 47, delete "quide." and insert -- guide. --, therefor.

In Column 28, Claim 12, Line 46, delete "optional removable" and insert -- removable --, therefor.